(12) United States Patent
Fukaya et al.

(10) Patent No.: US 7,227,353 B2
(45) Date of Patent: Jun. 5, 2007

(54) ANGULAR POSITION DETERMINING APPARATUS WITH MALFUNCTION DETECTOR

(75) Inventors: Shigetoshi Fukaya, Toyota (JP); Yoko Ichikawa, Aichi-ken (JP); Naoki Nakane, Toyota (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 280 days.

(21) Appl. No.: 10/926,282

(22) Filed: Aug. 26, 2004

(65) Prior Publication Data

US 2005/0046418 A1 Mar. 3, 2005

(30) Foreign Application Priority Data

Aug. 29, 2003 (JP) ............................ 2003-307309

(51) Int. Cl.
G01B 7/30 (2006.01)
G01R 33/06 (2006.01)
H01L 43/06 (2006.01)
H01L 43/08 (2006.01)

(52) U.S. Cl. ............................................. 324/207.25
(58) Field of Classification Search ........... 324/207.12, 324/207.13, 207.15, 207.16, 207.2–207.25, 324/202
See application file for complete search history.

(56) References Cited

U.S. PATENT DOCUMENTS

| 3,194,990 A | * | 7/1965 | Kendall ..................... 310/10 |
| 5,528,139 A | | 6/1996 | Oudet et al. |
| 5,544,000 A | * | 8/1996 | Suzuki et al. ............... 361/139 |
| 5,789,917 A | | 8/1998 | Oudet et al. |
| 6,018,241 A | | 1/2000 | White et al. |
| 6,043,645 A | | 3/2000 | Oudet et al. |
| 6,201,389 B1 | * | 3/2001 | Apel et al. ................ 324/207.2 |
| 6,356,073 B1 | * | 3/2002 | Hamaoka et al. .......... 324/207.2 |
| 6,486,657 B2 | | 11/2002 | Schroeder |
| 2002/0089324 A1 | * | 7/2002 | Miyata et al. ............. 324/207.2 |
| 2002/0109501 A1 | | 8/2002 | Schroeder |
| 2002/0157481 A1 | | 10/2002 | Kogiso et al. |

FOREIGN PATENT DOCUMENTS

| EP | 0 949 744 A2 | 10/1999 |
| EP | 1 014 039 A1 | 6/2000 |
| EP | 1 120 626 A2 | 8/2001 |
| JP | B2-5-505883 | 8/1993 |
| JP | A-11-60101 | 6/1999 |
| JP | A-11-160101 | 6/1999 |
| JP | A-2003-207365 | 7/2003 |

OTHER PUBLICATIONS

U.S. Appl. No. 10/755,682, filed Jan. 13, 2004.
Search Report from French Patent Office issued on Aug. 29, 2006 for the corresponding French patent application No. FR 0409149 (a copy thereof).

* cited by examiner

*Primary Examiner*—Edward Lefkowitz
*Assistant Examiner*—Kenneth J. Whittington
(74) *Attorney, Agent, or Firm*—Posz Law Group, PLC

(57) ABSTRACT

An angular position determining apparatus is provided which includes a magnet affixed to a rotary shaft and a plurality of magnetic sensor elements and works to determine an angular position of the rotary shaft using outputs of the magnetic sensor elements. The apparatus also includes a malfunction detector which specifies which of the magnetic sensor elements is now malfunctioning and takes an action required to determine the angular position of the rotary shaft correctly in the event of such a malfunction.

13 Claims, 13 Drawing Sheets

FIG. 4(a)    FIG. 4(b)    FIG. 4(c)
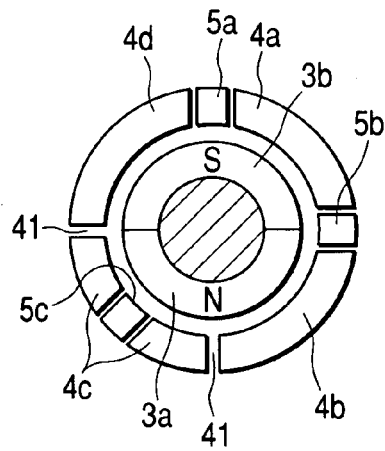
(I) 0 [deg]
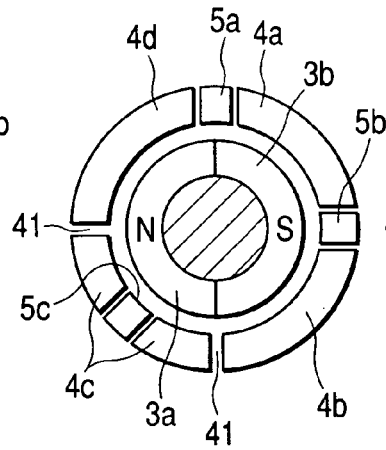
(II) 90 [deg]
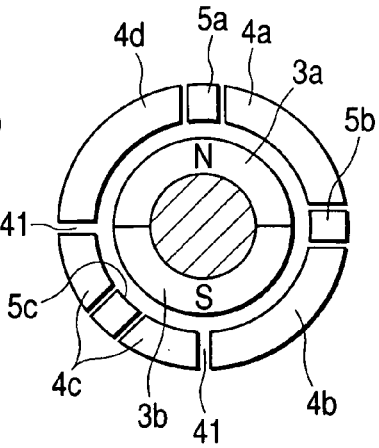
(III) 180 [deg]
FIG. 4(d)
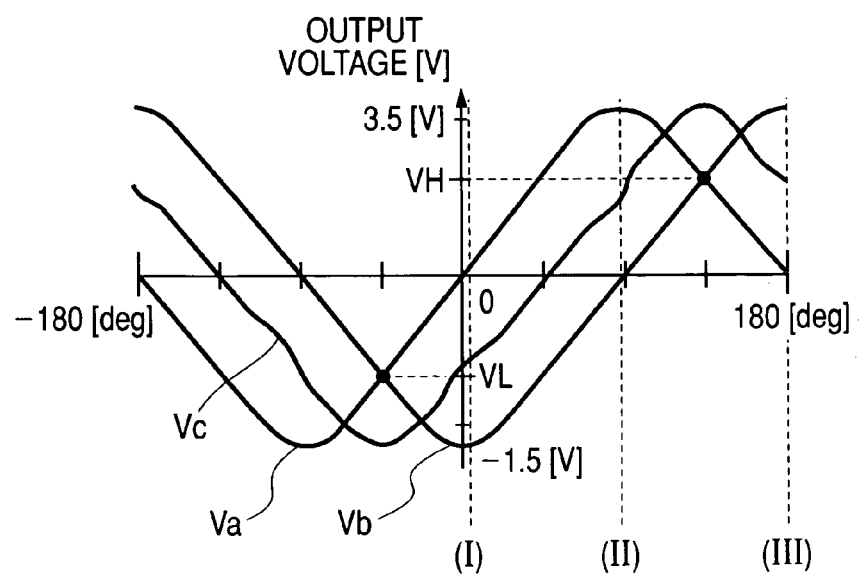

ANGULAR POSITION DETERMINING APPARATUS WITH MALFUNCTION DETECTOR

BACKGROUND OF THE INVENTION

1. Technical Field of the Invention

The present invention relates generally to an angular position determining apparatus working to measure an angular position of a rotary member, and more particularly to such an angular position determining apparatus quipped with a plurality of magnetic sensors and a malfunction detector which is designed to determine an angular position of a rotary shaft accurately even if any of the magnetic sensors is malfunctioning.

2. Background Art

Typical angular position sensors working to measure an angular position of a rotary shaft are made up of a ring-shaped magnet with an N-pole and an S-pole arrayed in a circumferential direction thereof, a magnetic yoke disposed around the periphery of the magnet, and magnetic sensors. The magnetic yoke has formed therein radial grooves forming air gaps. The magnetic sensors are disposed within the air gaps and work to measure magnetic flux densities in the air gaps. The angular position sensor determines the angular position of the rotary shaft using outputs of the magnetic sensors. For instance, U.S. Pat. No. 5,528,139 to Oudet et al., issued Jun. 18, 1996 (corresponding to Japanese Patent No. 2842482) teaches such a type of angular position sensor.

The above type of angular position sensors do not have a malfunction detector and thus encounter a difficulty in determining the angular position of the rotary shaft if any of the magnetic sensors has failed.

SUMMARY OF THE INVENTION

It is therefore a principal object of the invention to avoid the disadvantages of the prior art.

It is another object of the invention to provide an angular position determining apparatus designed to detect occurrence of a malfunction of magnetic sensors and to ensure the reliability of operation of the apparatus in the even of such a malfunction.

According to one aspect of the invention, there is provided an angular position determining apparatus which may be employed in electric power steering devices for automotive vehicles. The angular position determining apparatus comprises: (a) a hard magnetic member joined to a rotary member, the hard magnetic member having a circumference and magnetized in a circumferential direction thereof to have a first and a second magnetic pole which produce a magnetic field therearound; (b) a soft magnetic member disposed outside the circumference of the hard magnetic member within the magnetic field produced by the hard magnetic member, the soft magnetic member having a circumference and being made up of a plurality of magnetic sections array along the circumference of the soft magnetic member through gaps, rotation of the rotary member to change a relative angular position between the the hard magnetic member and the soft magnetic member causes a magnetic flux density within each of the gaps to change; (c) a plurality of magnetic flux density measuring sensors each of which works to measure the magnetic flux density within one of the gaps to produce an electric signal as a function of the magnetic flux density as indicating an angular position of the rotary member; (d) an angular position determining circuit working to determine an angular position of the rotary shaft using the electric signals outputted from the magnetic flux density measuring sensors; and (e) a malfunction detecting circuit working to detect occurrence of a malfunction of each of the magnetic flux density measuring sensors based on the electric signals outputted from the magnetic flux density measuring sensors and outputting a signal indicative thereof.

The angular position determining circuit monitors the signal outputted from the malfunction detecting circuit and may take an action needed to eliminate an error output thereof in the event of the malfunction of the magnetic flux density measuring sensors.

In the preferred mode of the invention, when the malfunction detecting circuit has detected the malfunction of any of the magnetic flux density measuring sensors, the malfunction detecting circuit specifies which of the magnetic flux density measuring sensors is being malfunctioning. The angular position determining circuit determines the angular position of the rotary shaft using the electric signals outputted from the magnetic flux density measuring sensors which are operating properly.

The malfunction detecting circuit may be designed to measure changes in the electric signals outputted from the magnetic flux density measuring sensors in a given period of time. When the changes have unusual values, the malfunction determining circuit determines that the magnetic flux density measuring sensors have failed.

Specifically, the malfunction detecting circuit measures the changes in the electric signals outputted from two of the magnetic flux density measuring sensors in the given period of time. When an absolute value of a difference between the changes is greater than a given value, the malfunction determining circuit determines that either of the two of the magnetic flux density measuring sensors has failed.

The malfunction detecting circuit preferably measures the changes in the electric signals outputted from the two of the magnetic flux density measuring sensors when the electric signals of the two of the magnetic flux density measuring sensors are changing at a constant rate. When the magnetic flux density measuring sensors are operating properly, the changes in the electric signals will be substantially identical with each other. Thus, when there is a difference between the changes of the electric signals of any two of the magnetic flux density measuring sensors, it is possible to determine either of the two of the magnetic flux density measuring sensors as being malfunctioning.

The magnetic flux density measuring sensors may be implemented by-a first, a second, and a third magnetic flux density measuring sensors which are disposed within the gaps, respectively. The electric signal outputted from each of the first to third magnetic flux density measuring sensors changes cyclically in the form of a periodic triangular wave as a function of the angular position of the rotary shaft. When the electric signal outputted from one of the first to third magnetic flux density measuring sensors has one of a maximum and a minimum value appearing on the triangular wave thereof, the malfunction detecting circuit measures the changes in the electric signals outputted from other two of the first to third second magnetic flux density measuring sensors in the given period of time. Specifically, when the electric signal produced by one of the first to third magnetic flux density measuring sensors has the maximum or minimum value, it means that the electric signals produced by the other two of the first to third magnetic flux density measuring sensors lie on straight segments of the periodic triangular waves thereof wherein the electric signals change at a constant rate following rotation of the rotary shaft. The malfunction of the magnetic flux density measuring sensors is, therefore, detected accurately by monitoring the changes in the electric signals of two of the magnetic flux density measuring sensors which do not have either of the maximum and minimum values.

The electric signals outputted by the first to third magnetic flux density measuring sensors may be voltage signals. The voltage signals of the first and second magnetic flux density measuring sensors may have the periodic triangular waves 90° out of phase with each other. In this case, the triangular waves of the voltage signals of the first and second magnetic flux density measuring sensors have a first and a second intersection in a 360° range of the angular position of the rotary shaft. The voltage level of the voltage signal at the first intersection is greater than that at the second intersection. When the voltage signal outputted from one of the first and second magnetic flux density measuring sensors has the maximum value appearing on the triangular wave thereof, the voltage signal of the one of the first and second magnetic flux density measuring sensors is greater in voltage level than the first intersection. When the voltage signal outputted from one of the first and second magnetic flux density measuring sensors has the minimum value appearing on the triangular wave thereof, the voltage signal of the one of the first and second magnetic flux density measuring sensors is smaller in voltage level than the second intersection. Use of such relations allows a determination of whether the electric signal produced by each of the first to third magnetic flux density measuring sensors has the maximum or minimum value to be made.

Each of the first and second magnetic poles may be designed to occupy 180° of the circumference of the hard magnetic member. The gaps in the soft magnetic member may be made up of a first, a second, a third, a fourth, and a fifth gap. The first to fourth gaps are arrayed at an interval of substantially 90° away from each other along the circumference of the soft magnetic member. The fifth gap is formed intermediate between the third and fourth gaps. The first and second magnetic flux density measuring sensors are disposed within the first and second gaps located adjacent each other, respectively, while the third magnetic flux density measuring sensor is disposed within the fifth gap. Specifically, the waveforms of the electric signals produced by the first to third magnetic flux density measuring sensors do not coincide with each other. Thus, for example, when the electric signal produced by the first magnetic flux density measuring sensor has either of the maximum and minimum value, the electric signals produced by the second and third magnetic flux density measuring sensors lie on straight segments of the periodic triangular waves thereof where the electric signals change at a constant rate as a function of the angular position of the rotary shaft. This permits the malfunction detecting circuit to detect the malfunctions of the second and third magnetic flux density measuring sensors correctly.

The magnetic flux density measuring sensors may be disposed within some of the gaps. Each of the gaps within which the magnetic flux density measuring sensors are disposed has a length in a circumferential direction of the soft magnetic member which is smaller than that of one of the gaps within which no magnetic flux density measuring sensor is disposed. This reduces a leakage of magnetic flux outside the gaps within which no magnetic flux density measuring sensor is disposed.

When the absolute value of the difference between the changes is greater than the given value, the malfunction determining circuit may specify one of the two of the magnetic flux density measuring sensors which has the change in the electric signal showing an unusual value as being malfunctioning. In this case, the angular position determining circuit may determine the angular position of the rotary shaft using the electric signals outputted from the other magnetic flux density measuring sensors which are in service. Specifically, the angular position determining circuit may continue to calculate the angular position of the rotary shaft if any one of the magnetic flux density measuring sensors has failed. This ensures the reliability of operation of the angular position determining apparatus.

When the electric signal outputted from the third magnetic flux density measuring sensor has one of the maximum and the minimum value appearing on the triangular wave thereof, the malfunction detecting circuit may measure the changes in the electric signals outputted from the first and second magnetic flux density measuring sensors in the given period of time. When the absolute value of the difference between the changes in the electric signals of the first and second magnetic flux density measuring sensors is greater than the given value, the malfunction determining circuit may specify either of the first and second magnetic flux density measuring sensors as being malfunctioning. If the first magnetic flux density measuring sensor is determined as being malfunctioning. The angular position determining circuit may determine the angular position of the rotary shaft using the electric signals outputted from the second and third magnetic flux density measuring sensors. Alternatively, if the second magnetic flux density measuring sensor is determined as being malfunctioning, the angular position determining circuit may determine the angular position of the rotary shaft using the electric signals outputted from the first and third magnetic flux density measuring sensors.

The malfunction detecting circuit may store therein unusual values of the electric signals outputted from the first and second magnetic flux density measuring sensors during a period of time when the electric signals of the first and second magnetic flux density measuring sensors change at a constant rate following rotation of the rotary shaft, which are determined as expected when the first and second magnetic flux density measuring sensors are malfunctioning. In this case, the malfunction detecting circuit determines one of the first and second magnetic flux density measuring sensors which has the change in the electric signal showing a corresponding one of the stored unusual values as being malfunctioning.

The electric signals outputted by the first to third magnetic flux density measuring sensors may be provided by voltage signals. The voltage signals of the first to third magnetic flux density measuring sensors may have the periodic triangular waves 120° out of phase with each other. In this case, the triangular waves of the voltage signals of the first and second magnetic flux density measuring sensors have a first and a second intersection in a 360° range of the angular position of the rotary shaft. The voltage level of the voltage signal at the first intersection is greater than that at the second intersection. When the voltage signal outputted from one of the first and second magnetic flux density measuring sensors has the maximum value appearing on the triangular wave thereof, the voltage signal of the one of the first and second magnetic flux density measuring sensors is greater in voltage level than the first intersection. When the voltage signal outputted from one of the first and second magnetic flux density measuring sensors has the minimum value appearing on the triangular wave thereof, the voltage signal of the one of the first and second magnetic flux density measuring sensors is smaller in voltage level than the second intersection. Use of such relations allows a determination of whether the electric signal produced by each of the first to third magnetic flux density measuring sensors has the maximum or minimum value to be made.

Each of the first and second magnetic poles may occupy 180° of the circumference of the hard magnetic member. The gaps in the soft magnetic member may be provided by a first, a second, and a third gap which are arrayed at an interval of substantially 120° away from each other along the circumference of the soft magnetic member. The first to third magnetic flux density measuring sensors are disposed within the first to third gaps, respectively. Specifically, the waveforms of the electric signals produced by the first to third magnetic flux density measuring sensors do not coincide with each other. Thus, for example, if the electric signal produced by the first magnetic flux density measuring sensor has either of the maximum and minimum value, the electric signals produced by the second and third magnetic flux density measuring sensors lie on straight segments of the periodic triangular waves thereof where the electric signals change at a constant rate as a function of the angular position of the rotary shaft. This permits the malfunction detecting circuit to detect the malfunctions of the second and third magnetic flux density measuring sensors correctly.

When the absolute value of the difference in the changes in the electric signals of any two of the first to third magnetic flux density measuring sensors is greater than the given value, the malfunction detecting circuit may determine either of the two of the magnetic flux density measuring sensors as being malfunctioning. If the first magnetic flux density measuring sensor is determined as being malfunctioning, the angular position determining circuit determines the angular position of the rotary shaft using the electric signals outputted from the second and third magnetic flux density measuring sensors. If the second magnetic flux density measuring sensor is determined as being malfunctioning, the angular position determining circuit determines the angular position of the rotary shaft using the electric signals outputted from the first and third magnetic flux density measuring sensors. If the third magnetic flux density measuring sensor is determined as being malfunctioning, the angular position determining circuit determines the angular position of the rotary shaft using the electric signals outputted from the first and second magnetic flux density measuring sensors, Specifically, the angular position determining circuit may continue to calculate the angular position of the rotary shaft if any one of the magnetic flux density measuring sensors has failed. This ensures the reliability of operation of the angular position determining apparatus.

The malfunction detecting circuit may store therein unusual values of the electric signals outputted from the first to third magnetic flux density measuring sensors during a period of time when the electric signals of the first to third magnetic flux density measuring sensors change at a constant rate following rotation of the rotary shaft, which are provided as expected when the first to third magnetic flux density measuring sensors are malfunctioning. In this case, the malfunction detecting circuit determines one of the first to third magnetic flux density measuring sensors which has the change in the electric signal showing a corresponding one of the stored unusual values as being malfunctioning.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 4(a) is a transverse sectional view which shows a positional relation between a magnet and a rotary shaft when the rotary shaft is in an angular position of 0°;

FIG. 4(b) is a transverse sectional view which shows a positional relation between a magnet and a rotary shaft when the rotary shaft is in an angular position of 90°;

FIG. 4(c) is a transverse sectional view which shows a positional relation between a magnet and a rotary shaft when the rotary shaft is in an angular position of 180°;

FIG. 4(d) is a graph which shows periodic waves indicative of changes in output voltages of sensor elements of a magnetic sensor upon rotation of a rotary shaft to which a magnet is affixed;

DESCRIPTION OF THE PREFERRED EMBODIMENTS

Figure 1A:
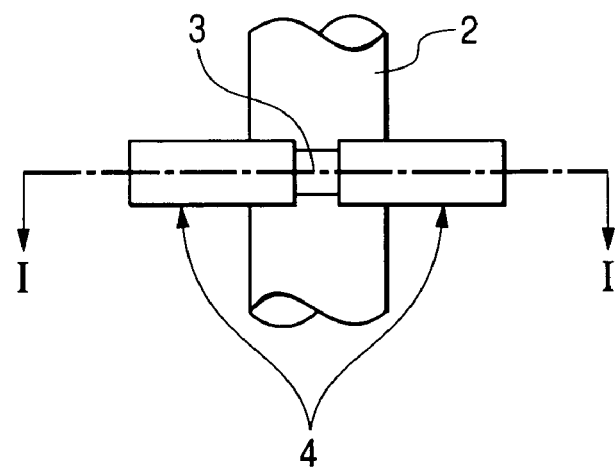
FIG. 1(a) is a side view which shows an angular position sensor according to the first embodiment of the invention.
Figure 1B:
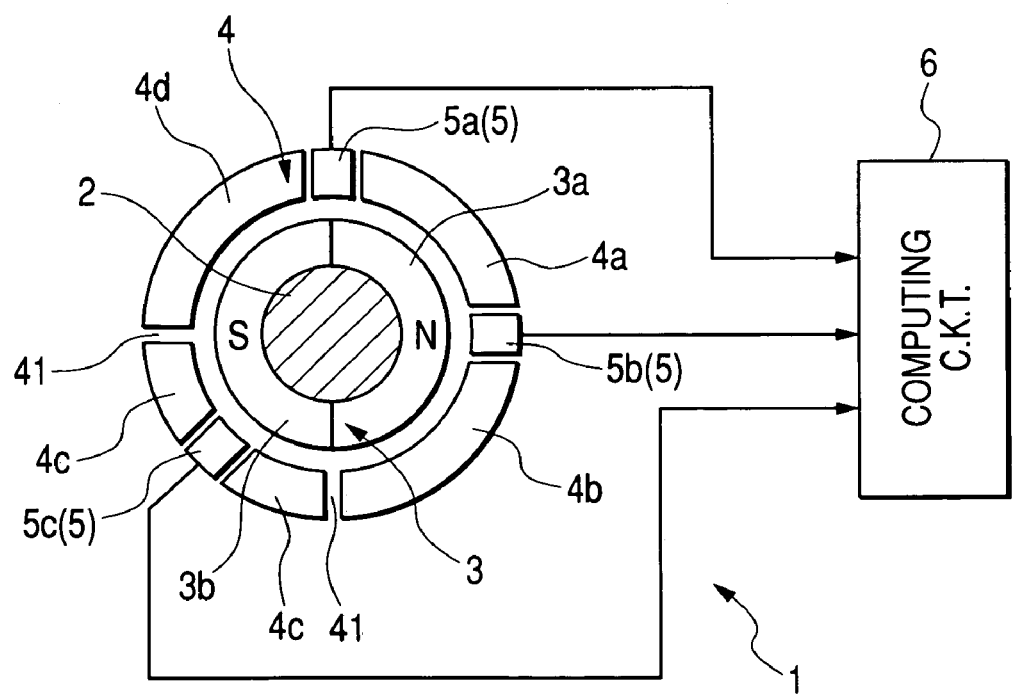
FIG. 1(b) is a transverse sectional view, as taken along the line I—I in FIG. 1(a), which shows an angular position detector of the first embodiment of the invention.

Referring to the drawings, wherein like reference numbers refer to like parts in several views, particularly to FIGS. 1(a) and 1(b), there is shown an angular position determining apparatus 1 according to the first embodiment of the invention which will be referred to as an angular position detector below.

The angular position detector 1 consists essentially of an angular position sensor installed on an outer periphery of a rotary shaft 2 and an angular position computing circuit 6. The angular position computing circuit 6 works to determine an angular position of the rotary shaft 2 using an output of the angular position sensor.

The angular position sensor includes a magnet 3 made of a hard magnetic material, a yoke 4 made of a soft magnetic material, and a magnetic sensor 5 working to measure the density of magnetic flux.

Figure 2:
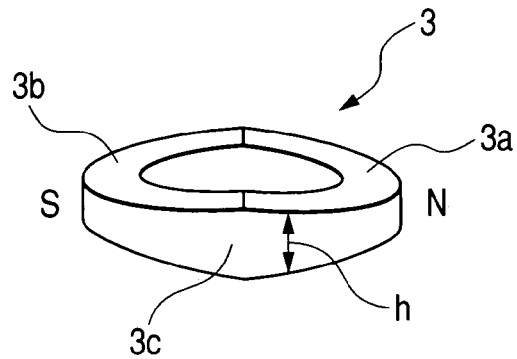
FIG. 2 is a perspective view which shows a magnet of the angular position sensor of FIGS. 1(a) and 1(b)

The magnet 3 is of a ring-shape and affixed to the outer periphery of the rotary shaft 2. The magnet 3 is made up of two semicircular part: one having an N-pole 3a, and the other having an S-pole 3b. The N-pole 3a and the S-pole 3b are joined integrally at ends thereof at locations 180° far away from each other. The magnet 3 has a thickness h, as shown in FIG. 2, which decreases gradually from interfaces 3c between the N-pole 3a and the S-pole 3b to circumferential centers of the N-pole 3a and the S-pole 3b.

The yoke 4 is of an annular shape and made up of four arc-segments 4a to 4b (will also be referred to as a first, a second, a third, and a fourth yoke segment below) which are arrayed in a circle around the periphery of the magnet 3 through air gaps 41 located at approximately 90° away from each other. The third segment 4c is also made up of two discrete parts between which an air gap 41 exits. The yoke 4 has a thickness, as shown in FIG. 1(a), greater than that of the magnet 3. The circumferential center line of the yoke 4 (i.e., a line extending through the middle of the thickness of the yoke 4) coincides with that of the magnet 3 over the entire circumference thereof. In other words, the magnet 3 and the yoke 4 are so disposed that a plane defined on the circumferential center line of the magnet 3 in a thickness-wise direction thereof coincides with that defined on the circumferential center line of the yoke 4 in a thickness-wise direction thereof.

Figure 9:
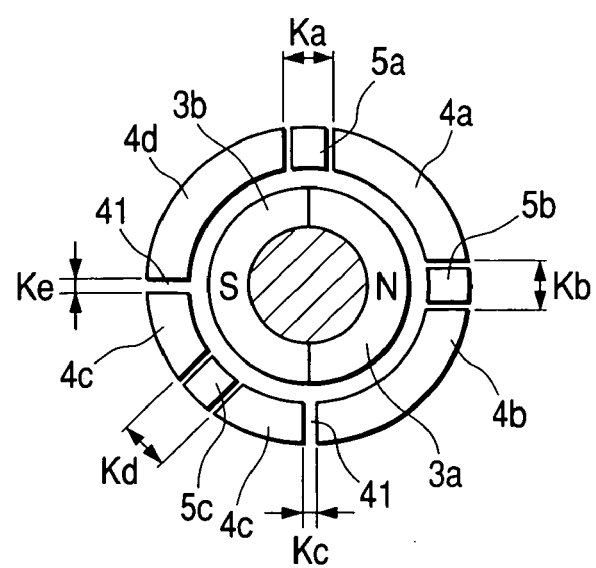
FIG. 9 is a transverse sectional view which shows an angular position sensor of the first embodiment of the invention.

The magnetic sensor 5 is made up of a first sensor element 5a, a second sensor element 5b, and a third sensor element 5c. The first sensor element 5a is disposed within the gap 41 between the first and fourth yoke segments 4a and 4b. The second sensor element 5b is disposed within the gap 41 between the first and second yoke segments 4a and 4b. The third sensor element 5c is disposed within the gap 41 formed in the circumferential center of the third yoke segment 4c. The first to third elements 5a to 5c work to measure magnetic flux developed in the gaps 41 as indicating the density of the magnetic flux, respectively. The first to third sensor elements 5a to 5c are separate from the yoke 4 and each implemented by, for example, a Hall sensor, a Hall IC, or a magneto-resistive device which works to output an electric signal (e.g., a voltage signal) as a function-of the density of magnetic flux within the gap 41 to the angular position computing circuit 6. The third sensor element 5c is provided, as described later in detail, for monitoring failures in operation of the first and second sensor elements 5a and 5b. The sizes of the gaps 41 within which the first to third sensor elements 5a to 5c are disposed, namely, circumferential lengths Ka, Kb, and Kc of the gaps 41, as illustrated in FIG. 9, are substantially identical with each other and greater than circumferential lengths Kc and Ke of the gaps 41 between the second and third sensor elements 5b and 5c and between the third and fourth sensor elements 5c and 5d within which no sensor elements are disposed.

The angular position computing circuit 6 works to determine an angular position (i.e., an absolute angle) of the rotary shaft 2 using the electric signals outputted from the first to third sensor elements 5a to 5c. Specifically, when the first to third sensor elements 5a to 5c are functioning normally, the angular position computing circuit 6 combines or links the outputs of the first and second sensor elements 5a and 5b together to determine the angular position of the rotary shaft 2 continuously over 90°.

The density of magnetic flux generated by the magnet 3 will be described below.

Figure 3A:
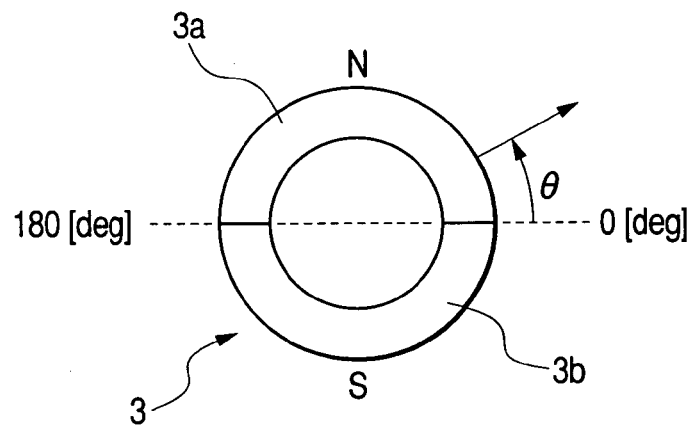
FIG. 3(a) is a plane view which shows orientation of magnetic flux flowing out of the magnet of FIG. 2.
Figure 3B:
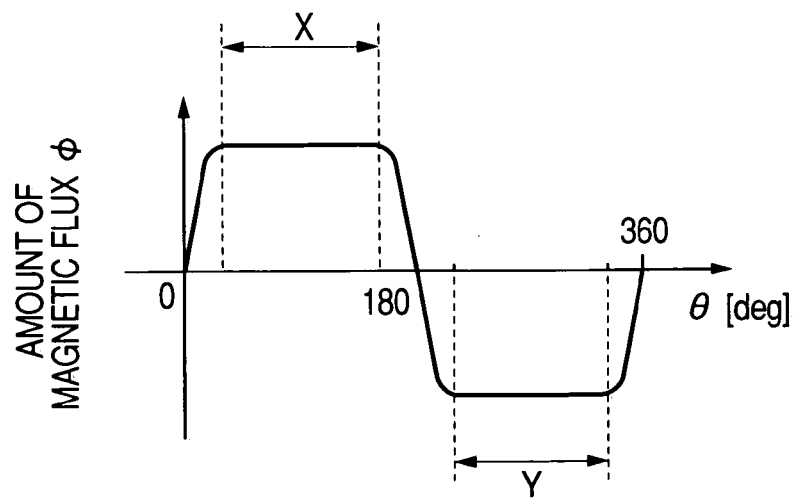
FIG. 3(b) is a graph which shows a periodic wave indicative of a change in amount of magnetic flux upon rotation of a rotary shaft to which a magnet is affixed.

The thickness h of the magnet 3, as described above, decreases from the interfaces 3c between the ends of the N-pole 3a and the ends of the S-pole 3b to the circumferential centers thereof, so that the thickness of the circumferential centers of the N-pole 3a and the S-pole 3b is smaller than that of the interfaces 3c. Specifically, an area of a peripheral surface around the circumferential centers of the N-pole 3a and the S-pole 3b of the magnet 3 is smaller than that when the thickness h is constant over the entire circumference of the magnet. In other words, the amount of magnetic flux produced in the radius direction of the magnet 3 from the circumferential centers of the N-pole 3a and the S-pole 3b which are the greatest in magnetic flux density is decreased. This causes a total amount of magnetic flux to be almost uniform around the circumferential centers of the N-pole 3a and the S-pole 3b of the magnet 3. Rotation of the magnet 3 (i.e., the rotary shaft 2) will cause the amount of magnetic flux flowing through each of the sensor elements 5a to 5c of the magnetic sensor 5 to change cyclically in the form of a wave, as shown in FIG. 3(b). The amount of magnetic flux within a range X (i,e., around the circumferential center of the N-pole 3a) is substantially identical with that within a range Y (around the circumferential center of the N-pole 3b).

A decrease in thickness h of the magnet 3 from the interfaces 3c between the N-pole 3a and the S-pole 3b is so selected that the amount of magnetic flux created from around each of the circumferential centers of the N-pole 3a and the S-pole 3b is substantially constant. Alternatively, a radius thickness of the magnet 3 may be decreased from the interface 3c toward the circumferential centers of the N-pole 3a and the S-pole 3b.

A change in magnetic flux density as measured by the magnetic sensor 5 when the rotary shaft 2 rotates in a circumferential direction thereof will be described below with reference to FIGS. 4(a) to 4(d).

When the rotary shaft 2 is, as shown in FIG. 4(a), at an angular position I of zero (0°), no magnetic flux flows through the gap 41 between the first and fourth yoke segments 4a and 4d, so that the magnetic flux density shows zero (0), while a maximum magnetic flux density of a negative polarity is developed in the gap 41 between the first and second yoke segments 4a and 4b. The first and second sensor elements 5a and 5b output voltage signals having levels on a broken line I, as illustrated in FIG. 4(d).

When the rotary shaft 2 rotates 90° in a clockwise direction from the angular position I to an angular position II, as shown in FIG. 4(b), it causes a maximum magnetic flux density of a positive polarity to be developed in the gap 41 between the first and fourth yoke segments 4a and 4d, while no magnetic flux flows through the gap 41 between the first and second yoke segments 4a and 4b. The first and second sensor elements 5a and 5b output voltage signals having levels on a broken line if, as illustrated in FIG. 4(d).

When the rotary shaft 2 further rotates 90° in the clockwise direction from the angular position II to an angular position III, as shown in FIG. 4(c), it causes a maximum magnetic flux density of the positive polarity to be developed in the gap 41 between the first and second yoke segments 4a and 4b, while no magnetic flux flows through the gap 41 between the first and fourth yoke segments 4a and 4d. The first and second sensor elements 5a and 5b output voltage signals having levels on a broken line III, as illustrated in FIG. 4(d).

Specifically, the voltage signals produced by the first and second sensor elements 5a and 5b show triangular waves which are approximately 90° out of phase with each other. This causes intersections VL and VH between the voltage signals of the first and second sensor elements 5a and 5b to appear at angular positions of −45° and 135° of the rotary shaft 2. The voltage signal produced by the third sensor element 5c is, as can be seen from FIG. 4(d), approximately 45° out of phase with those produced by the first and second sensor elements 5a and 5b.

The amount of magnetic flux flowing from around each of the circumferential centers of the N-pole 3a and the S-pole 3b is, as described above, substantially constant, thus causing the magnetic flux density within the gaps 41 between the first and fourth yoke segments 4a and 4d and between the first and second yoke segments 4a and 4b during rotation of the rotor shaft 2 to change at a constant rate, so that the first and second sensor elements 5a and 5b output the voltage signals, as indicated by solid lines in FIG. 4(d). The third sensor element 5c is subjected to a small constant variation in the magnetic density as compared with the first and second sensor element 5a and 5b. Such a variation appears on a straight section of the waveform in FIG. 4(d).

Figure 5A:
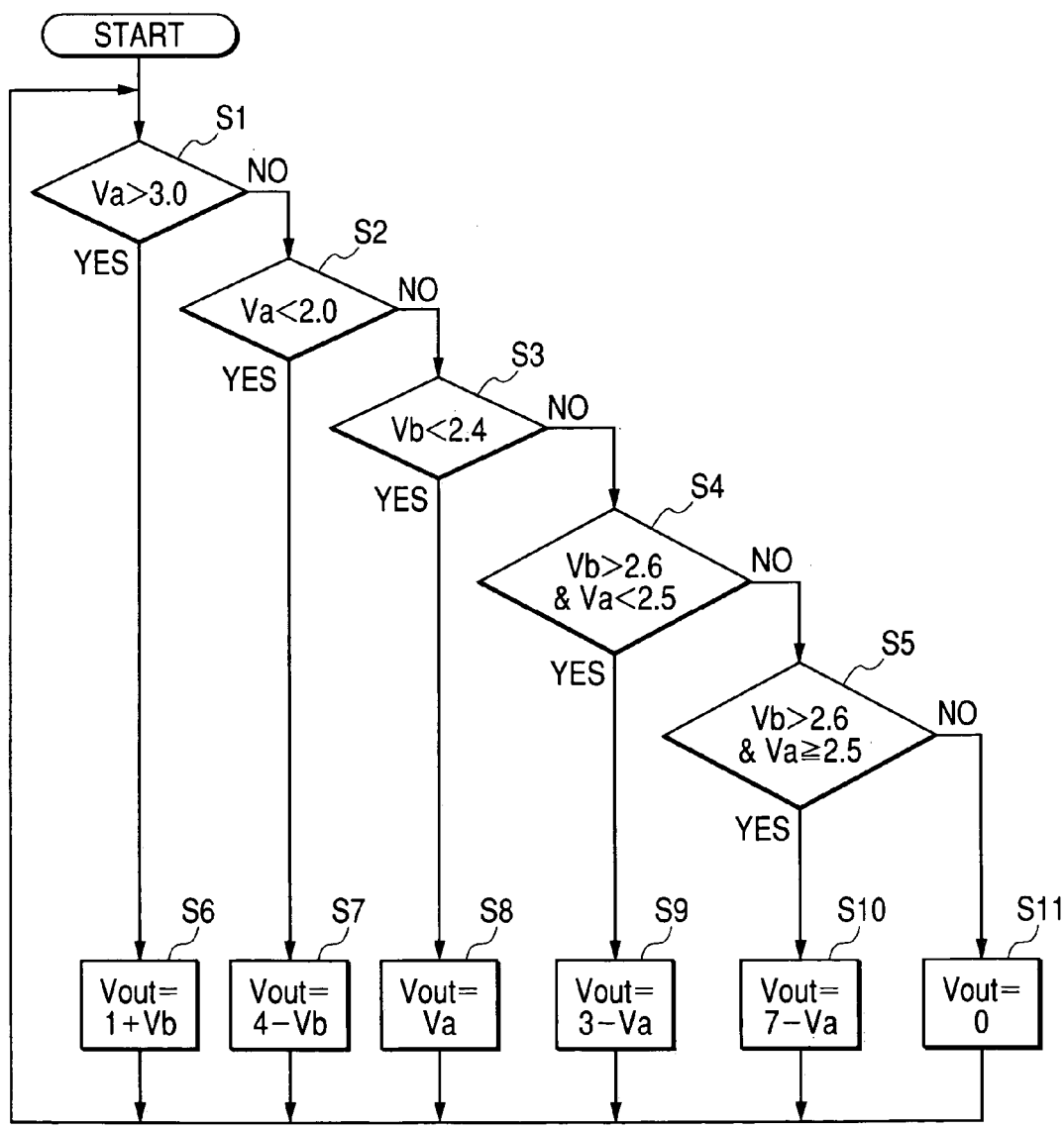
FIG. 5(a) is a flowchart of a program executed in an angular position computing circuit to produce an output voltage indicative of an angular position of a rotary shaft.

FIG. 5(a) shows a flowchart of logical steps or program executed by the angular position computing circuit 6 of the angular position detector 1. In the following discussion, voltage outputs of the first and second sensor elements 5a and 5b will be expressed by Va and Vb, respectively, and an output voltage of the angular position computing circuit 6 will be expressed by Vout.

After entering the program, the routine proceeds to step 1 wherein it is determined whether the voltage output Va is greater than 3.0V or not. If a YES answer is obtained (Va>3.0V), then the routine proceeds to step 6 wherein the output voltage Vout is determined according to a relation of Vout=1+Vb and returns back to step 1

Alternatively, if a NO answer is obtained (Va≦3.0V), then the routine proceeds to step 2 wherein it is determined whether the voltage output Va is smaller than 2.0V or not. If a YES answer is obtained (Va<2.0V), then the routine proceeds to step 7 wherein the output voltage Vout is determined according to a relation of Vout=4−Vb and returns back to step 1.

Alternatively, if a NO answer is obtained (Va≧2.0V), then the routine proceeds to step 3 wherein it is determined whether the voltage output Va is smaller than 2.4V or not. If a YES answer is obtained (Va<2.4V), then the routine proceeds to step 8 wherein the output voltage Vout is determined according to a relation of Vout=Va and returns back to step 1.

Alternatively, if a NO answer is obtained (Va≧2.4V), then the routine proceeds to step 4 wherein it is determined whether the output voltage Vb is greater than 2.6V, and the voltage output Va is smaller than 2.5V or not. If a YES answer is obtained (Vb>2.6V, and Va<2.5V), then the routine proceeds to step 9 wherein the output voltage Vout is determined according to a relation of Vout=3−Va and returns back to step 1.

Alternatively, if a NO answer is obtained in step 4, then the routine proceeds to step 5 wherein it is determined whether the output voltage Vb is greater than 2.6V, and the voltage output Va is greater than or equal to 2.5V or not. If a YES answer is obtained, then the routine proceeds to step 10 wherein the output voltage Vout is determined according to a relation of Vout=7−Va and returns back to step 1.

Alternatively, if a NO answer is obtained in step 5, the routine proceeds to step 11 wherein the output voltage Vout is determined according to a relation of Vout=0 and returns back to step 1.

Figure 6:
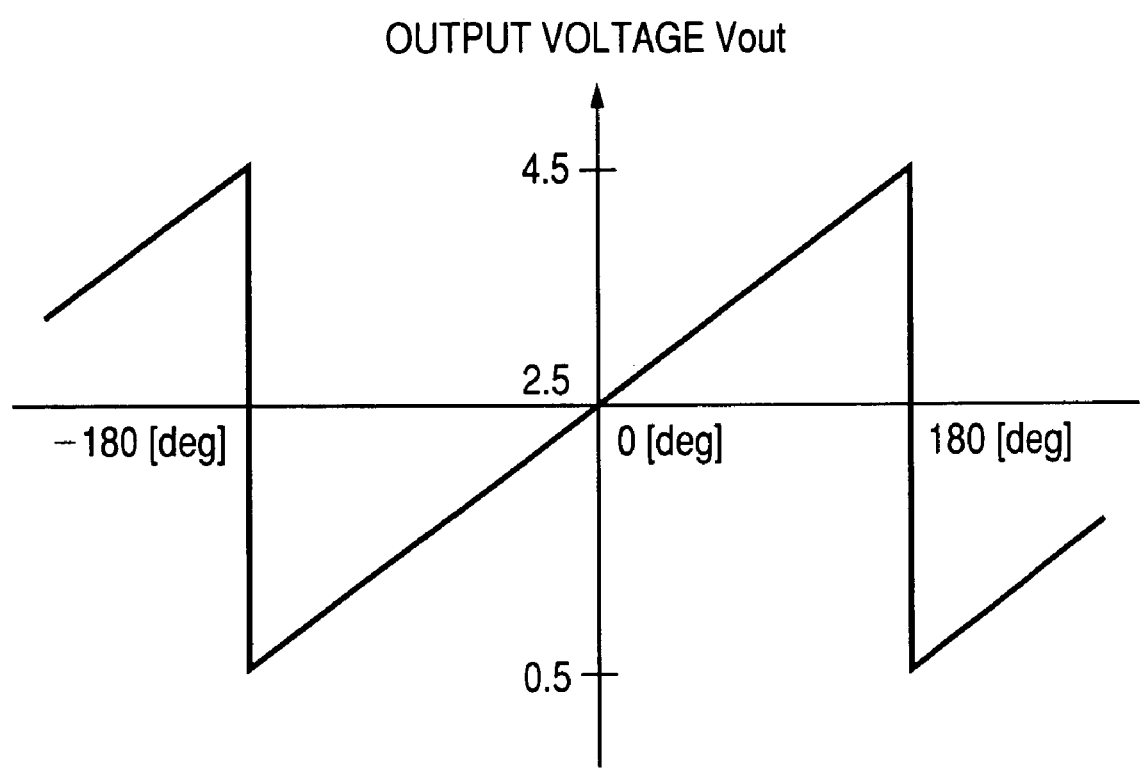
FIG. 6 is a graph which shows the output voltage as produced by the program of FIG. 5(a)

FIG. 6 shows the output voltage Vout of the angular position computing circuit 6, as derived in the above operations, which is created by combining the straight sections of waveforms of the voltage signals produced by the first and second sensor elements 5a and 5b and which changes at a constant rate over a 360° angular range (i.e., −180° to +180°) of the rotary shaft 2. Specifically, the angular position computing circuit 6 works to output an absolute angular position of the rotary shaft 2 over the full angular range thereof.

Figure 7:
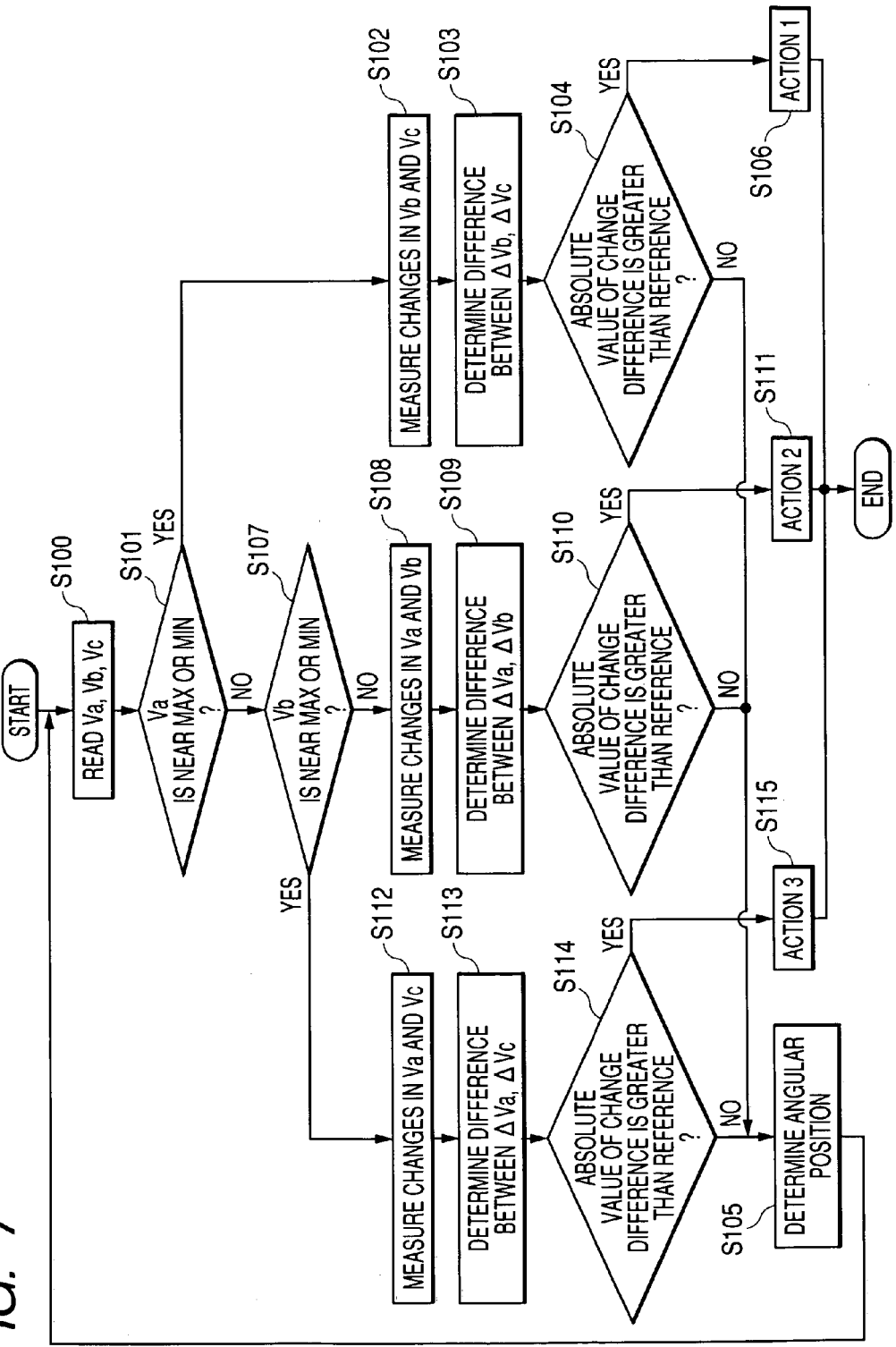
FIG. 7 is flowchart of a program executed by an angular position computing circuit to specify which sensor element is malfunctioning and to take an action required to determine an angular position of a rotary shaft in the event of such a malfunction.

FIG. 7 is a flowchart of a program to be executed by the angular position computing circuit 6 to detect the event of malfunction of the magnetic sensor 5 and to take an action required to determine the angular position of the rotary shaft 2 in the event of the malfunction. The voltage outputs of the first to third sensor elements 5a to 5c will be expressed by Va, Vb, and Vc, respectively, which are produced as a function of the angular position of the rotary shaft 2.

After entering the program, the routine proceeds to step 100 wherein the angular position computing circuit 6 picks up the voltage outputs Va, Vb, and Vc of the first to third sensor elements 5a to 5c of the magnetic sensor 5.

The routine proceeds to step 101 wherein it is determined whether the voltage output Va is showing a value near one of maximum and minimum voltages thereof or not, that is, whether the voltage output Va lies on the top or bottom of the periodic triangular wave thereof, as illustrated in FIG. 4(d), where a rate of change in the voltage output Va per unit time during rotation of the rotary shaft 2 is not constant. If a YES answer is obtained meaning that the value of the voltage output Va lies near the maximum or minimum voltage, then the routine proceeds to step 102. Alternatively, if a NO answer is obtained, then the routine proceeds to step 107. The determination in step 101 may be achieved by determining whether one of relations of Va<VL and Va>VH is met or not where VL and WI indicate levels of the voltage outputs Va and Vb appearing at the intersections VI and VH, as illustrated in FIG. 4(d), which are calculated in advance.

In step 102, changes ΔVb and a ΔVc in the voltage outputs Vb and Vc of the first and third sensor elements 5a and 5c within a given time period are determined. Specifically, step 102 is entered when the value of the voltage output Va lies near the maximum or minimum voltage, in other words, when the levels of the voltage outputs Vb and Vc of the second and third sensor elements 5b and 5c that are 90° and 45° out of phase with the voltage output Va, respectively, are appearing on the straight segments of the triangular waves thereof, as illustrated in FIG. 4(d), where the levels of the voltage outputs Vb and Vc change at a constant rate as a function the angular position of the rotary shaft 2. Step 102, thus, determines the changes ΔVb and ΔVc in the voltage outputs Vb and Vc which are changing as a function of the angular position of the rotary shaft 2.

The routine proceeds to step 103 wherein a difference between the voltage changes ΔVb and ΔVc, as derived in step 102, is determined (i.e., ΔVb−ΔVc).

The routine proceeds to step 104 wherein it is determined whether an absolute value of the voltage difference ΔVb − ΔVc, as derived in step 103, is greater than a given value or not. When the second and third sensor elements 5*b* and 5*c* are operating normally, the voltage outputs Vb and Vc change at substantially the same rate. In this case, the absolute value of the voltage difference ΔVb −ΔVc becomes nearly zero (0). If a YES answer is obtained in step 104 meaning that |ΔVb −ΔVc| is greater than the given value, that is, that the voltage outputs Vb and Vc are changing at rates different from each other, then the routine proceeds to step 106. Alternatively, if a NO answer is obtained, then the routine proceed to step 105.

In step 105, as entered if the absolute value |ΔVb −ΔVc| is determined to be smaller than the given value in step 104, the angular position computing circuit 6 determines that the first to third sensor elements 5*a* to 5*c* are now operating normally and calculates the angular position of the rotary shaft 2 using the voltage outputs Va and Vb of the sensor elements 5*a* and 5*b* according to the program of FIG. 5(*a*). The routine then returns back to step 100.

In step 106, as entered if the absolute value |ΔVb −ΔVc| is determined to be greater than the given value in step 104, the angular position computing circuit 6 concludes that either of the second and third sensor elements 5*b* and 5*c* is malfunctioning and initiates an error correction/warning action 1 to specify which of the second and third sensor elements 5*b* and 5*c* is malfunctioning and to perform an error correction/warning operation, as discussed below.

The angular position computing circuit 6 has installed therein a map listing allowable voltage ranges ΔVa', ΔVb', and ΔVc' that are defined by changes in the voltage outputs Va, Vb, and Vc within the given period of time, as expected to appear within ranges where the values of the voltage outputs Va, Vb, and Vc change at a constant rate as a function of the angular position of the rotary shaft 2 (i.e., the straight segments of the triangular waves, as illustrated in FIG. 4(*d*)) in a case where the sensor elements 5*a* to 5*c* operate properly plus and minus a given permissible voltage level, as predetermined based on an operation cycle (i.e., a signal sampling cycle) in the angular position computing circuit 6 and a maximum speed of the rotary shaft 2. The angular position computing circuit 6 determines whether the voltage changes ΔVb and ΔVc in the second and third sensor elements 5*b* and 5*c*, as derived in step 102, lie within the allowable voltage ranges ΔVb' and ΔVc' or not and determines which of the second and third sensor elements 5*b* and 5*c* is now malfunctioning.

If it has been determined that only the voltage change ΔVb of the second sensor element 5*b* lies out of the allowable voltage range ΔVb' meaning that only the second sensor element 5*b* is now malfunctioning, the angular position computing circuit 6 calculates the angular position of the rotary shaft 2 using the voltage outputs Va and Vc of the first and third sensor elements 5*a* and 5*c* according to a program, as illustrated in FIG. 5(*b*), which is different from the one of FIG. 5(*a*) only in steps 30, 40, 50, 60, and 70. Specifically, the voltage output Vc is used instead of the voltage output Vb. The reference values, as used in the determination of steps 40, 60, and 70, are, as clearly shown in the drawing, different from those in the program of FIG. 5(*a*). Other operations are identical, and explanation thereof in detail will be omitted here.

Alternatively, if it has been determined that only the voltage change ΔVc of the third sensor element 5*c* lies out of the allowable voltage range ΔVc' meaning that only the third sensor element 5*c* is now malfunctioning, the angular position computing circuit 6 calculates the angular position of the rotary shaft 2 using the voltage outputs Va and Vb of the first and second sensor elements 5*a* and 5*b*.

Specifically, the voltage output Vc is used instead of the voltage output Vb. The reference values, as used in the determination of steps 41, 61, and 71, are, as clearly shown in the drawing, different from those in the program of FIG. 5(*a*). Other operations are identical, and explanation thereof in detail will be omitted here.

Alternatively, if it has been determined that both the voltage changes ΔVb and ΔVc lie out of the allowable voltage ranges ΔVb' and ΔVc' meaning that both the second and third sensor elements 5*b* and 5*c* are now malfunctioning, the angular position computing circuit 6 produces a warning output indicating that the magnetic sensor 5 is disenabled, that is, it is impossible to determine the angular position of the rotary shaft 2 to an external system which is to receive the output of the angular position detector 1.

Figure 8:
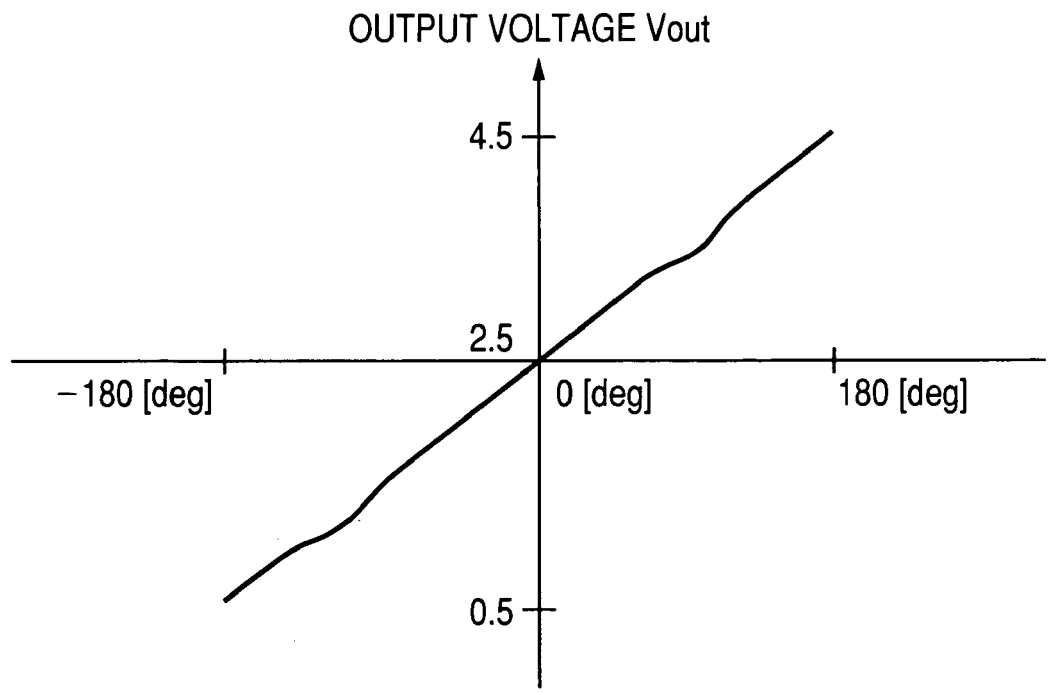
FIG. 8 is a graph which shows a change in voltage output from an angular position computing circuit.

Note that if only the second sensor element 5*b* is malfunctioning, the output Vout of the angular position computing circuit 6 has the waveform, as illustrated in FIG. 8, on which a variation in the voltage output Vc of the third sensor element 5*c* appears. Such a variation is small, and the output Vout useful in determining the angular position of the rotary shaft 2.

If a NO answer is obtained in step 101 meaning that the value of the voltage output Va of the first sensor element 5*a* is far away from the maximum or minimum one, the routine, as described above, proceeds to step 107 wherein it is determined whether the voltage output Vb is showing a value near one of maximum and minimum voltages thereof or not. If a YES answer is obtained meaning that the value of the voltage output Vb lies near the maximum or minimum voltage, then the routine proceeds to step 112. Alternatively, if a NO answer is obtained, then the routine proceeds to step 108. The determination in step 107 may be achieved by determining whether one of relations of Vb<VL and Vb>VH is met or not where VL and VH indicate levels of the voltage outputs Va and Vb appearing at the intersections VL and VH, as illustrated in FIG. 4(*d*), which are calculated in advance.

In step 108, changes ΔVa and ΔVb in the voltage outputs Va and Vb of the first and second sensor elements 5*a* and 5*b* in the given time period are determined. Specifically, step 108 is entered when the value of the voltage output Va is far away from the maximum-or minimum voltage, in other words, when the levels of the voltage outputs Va and Vb of the first and second sensor elements 5*a* and 5*b* that are 90° out of phase with each other, are appearing on the straight segments of the triangular waves thereof, as illustrated in FIG. 4(*d*), where the levels of the voltage outputs Va and Vb change at a constant rate as a function the angular position of the rotary shaft 2. Step 108, thus, determines the ΔVa and ΔVb in the voltage outputs Va and Vb of the first and second sensor elements 5*a* and 5*b*.

The routine proceeds to step 109 wherein a difference between the voltage changes ΔVa and ΔVb, as derived in step 108, is determined (i.e., ΔVa−ΔVb).

The routine proceeds to step 110 wherein it is determined whether an absolute value of the voltage difference ΔVa−ΔVb, as derived in step 109, is greater than a given value or not. If a YES answer is obtained meaning that |ΔVa−ΔVb| is greater than the given value, then the routine proceeds to step 111. Alternatively, if a NO answer is obtained, then the routine proceed to step 105.

In step 111, as entered if the absolute value |ΔVa−ΔVb| is determined to be greater than the given value in step 110, the angular position computing circuit 6 concludes that either of the first and second sensor elements 5a and 5b is malfunctioning and initiates an error correction/warning action 2 to specify which of the first and second elements 5a and 5b is malfunctioning and to perform an error correction/warning operation, as discussed below.

The angular position computing circuit 6, like in step 111, determines whether the voltage changes ΔVa and ΔVb of the first and second elements 5a and 5b, as derived in step 108, lie within the above described allowable voltage ranges ΔVa' and ΔVb' stored in the map or not and specifies which of the first and second sensor elements 5a and 5b is now malfunctioning.

Figure 5B:
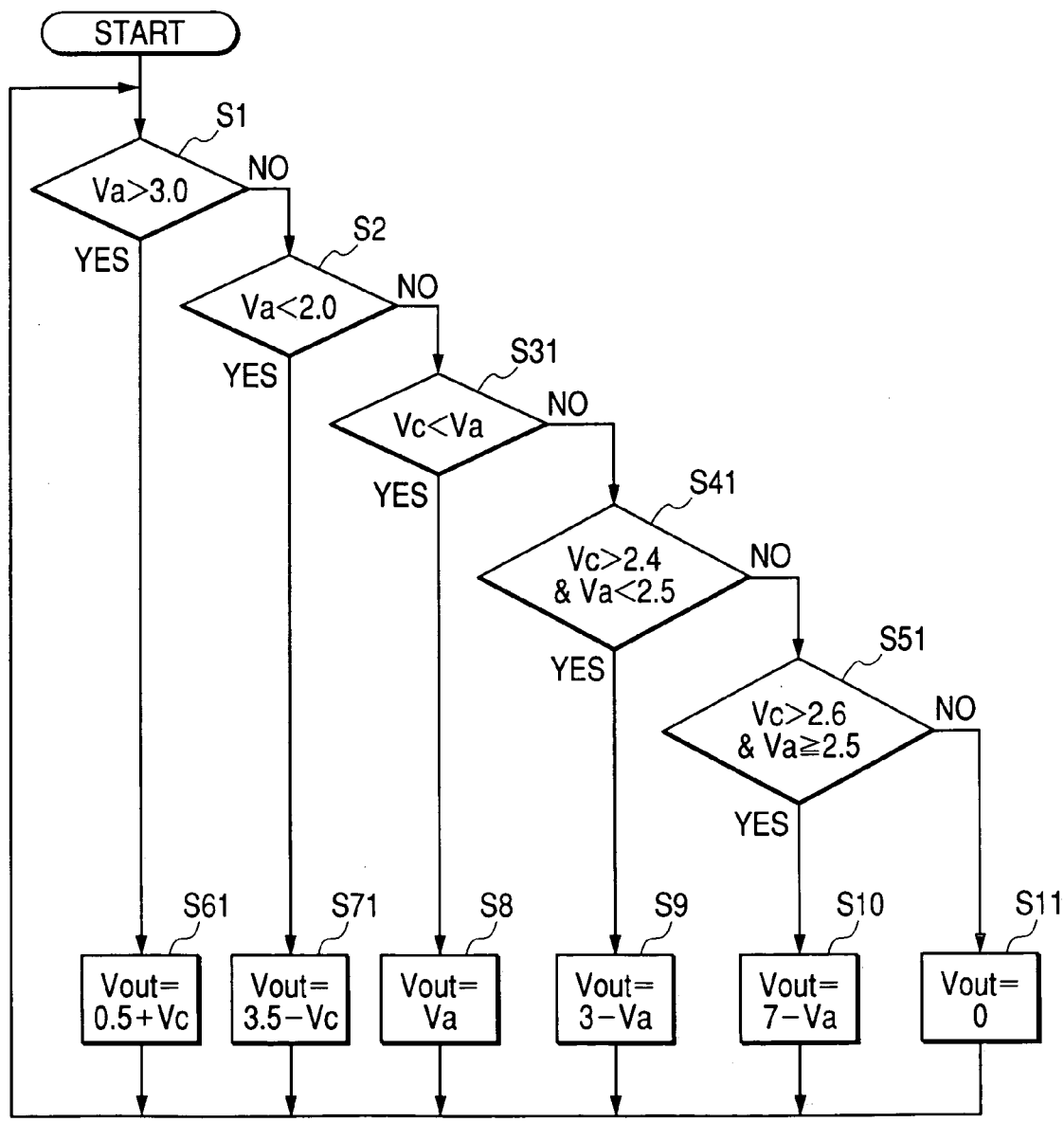
FIGS. 5(b) and 5(c) are flowcharts of programs executed by an angular position computing circuit when one of sensor elements is malfunctioning.
Figure 5C:
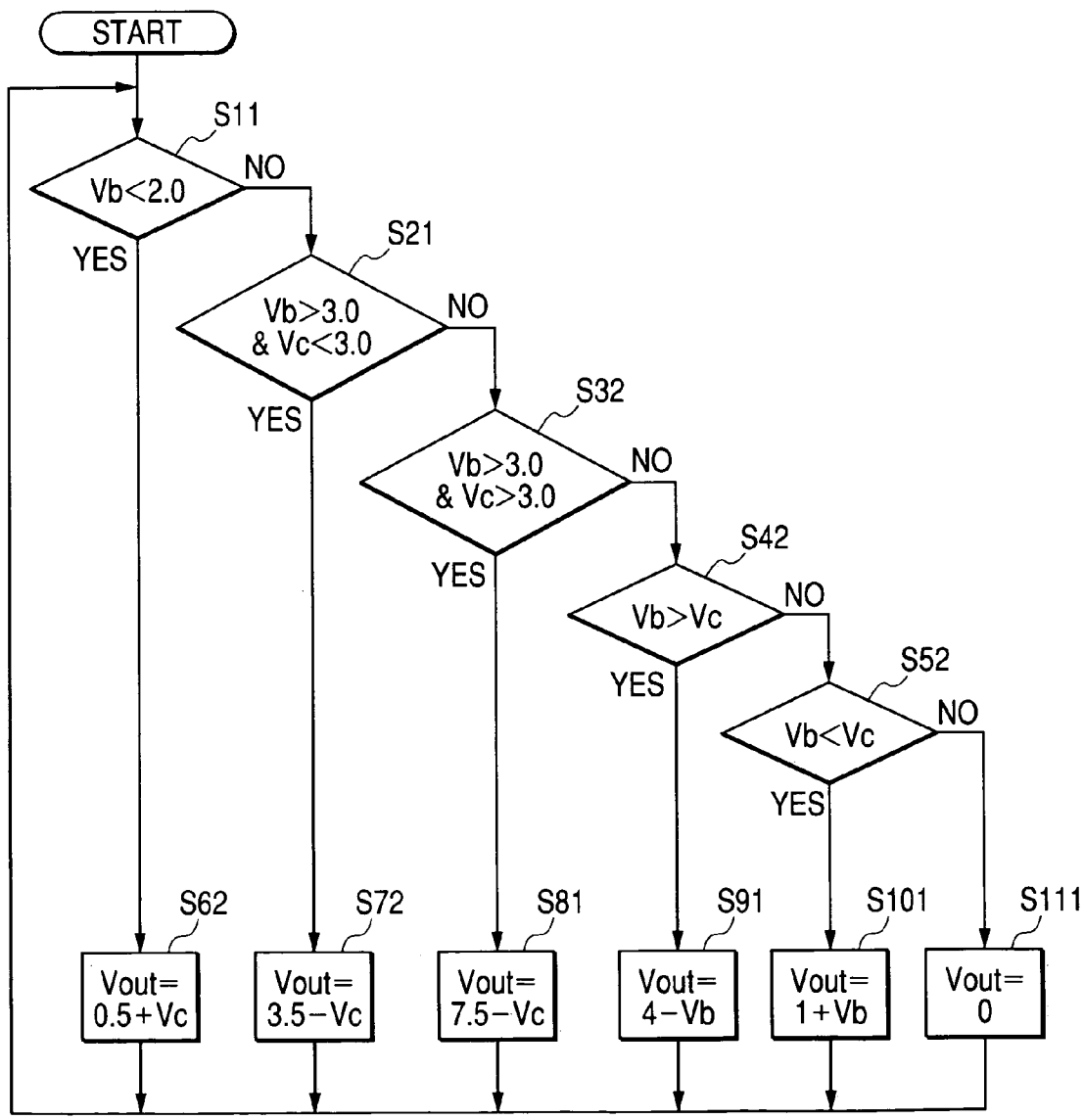

If it has been determined that only the first sensor element 5a is now malfunctioning, the angular position computing circuit 6 calculates the angular position of the rotary shaft 2 using the voltage outputs Vb and Vc of the second and third sensor elements 5b and 5c according to a program, as illustrated in FIG. 5(c), in which the voltage output Vb is used instead of the voltage output Va, and reference values different from those in FIG. 5(a) are used in the determinations of steps. Operations in steps 31, 41, 51, 61, and 71 are self-explanatory, and no attempt will be made here to describe them.

Alternatively, if it has been determined that only the second sensor element 5b is now malfunctioning, the angular position computing circuit 6 calculates the angular position of the rotary shaft 2 using the voltage outputs Va and Vc of the first and third sensor elements 5a and 5c according to the program of FIG. 5(b). Alternatively, if it has been determined that both the first and second elements 5a and 5b are now malfunctioning, the angular position computing circuit 6 produces a warning output indicating that the magnetic sensor 5 is disenabled, that is, it is impossible to determine the angular position of the rotary shaft 2 to the external system which is to receive the output of the angular position detector 1.

If a YES answer is obtained in step 107 meaning that the value of the voltage output Vb of the second sensor element 5b is near the maximum or minimum one, then the routine, as described above, proceeds to step 112 wherein changes ΔVa and ΔVc in the voltage outputs Va and Vc of the first and third sensor elements 5a and 5c in the given time period are determined. Specifically, step 112 is entered when the levels of the voltage outputs Va and Vc of the first and third sensor elements 5a and 5c that are 45° out of phase with the voltage output Vb are appearing on the straight segments of the waveforms thereof, as illustrated in FIG. 4(d), where the levels of the voltage outputs Va and Vc change at a constant rate as a function the angular position of the rotary shaft 2 and determines the changes ΔVa and ΔVc in the voltage outputs Va and Vc of the first and third sensor elements 5a and 5c in the given time period.

The routine proceeds to step 113 wherein a difference between the voltage changes ΔVa and ΔVc, as derived in step 112, is determined (i.e., ΔVa−ΔVc).

The routine proceeds to step 114 wherein it is determined whether an absolute value of the voltage difference ΔVa−ΔVc, as derived in step 113, is greater than a given value or not, If a YES answer is obtained meaning that |ΔVa−ΔVc| is greater than the given value, then the routine proceeds to step 115. Alternatively, if a NO answer is obtained, then the routine proceed to step 105.

In step 115, as entered if the absolute value |ΔVa−ΔVc| is determined to be greater than the given value in step 114, the angular position computing circuit 6 concludes that either of the first and third sensor elements 5a and 5c is malfunctioning and initiates an error correction/warning action 3 to specify which of the first and third elements 5a and 5c is malfunctioning and to perform an error correction/warning operation, as discussed below.

The angular position computing circuit 6, like in step 111, determines whether the voltage changes ΔVa and ΔVc in the first and third elements 5a and 5c, as derived in step 112, lie within the above described allowable voltage changes ΔVa' and ΔVc' stored in the map or not and determines which of the first and third sensor elements 5a and 5c is now malfunctioning.

If it has been determined that only the first sensor element 5a is now malfunctioning, the angular position computing circuit 6 calculates the angular position of the rotary shaft 2 using the voltage outputs Vb and Vc of the second and third sensor elements 5b and 5c according to the program of FIG. 5(c). Alternatively, if it has been determined that only the third sensor element 5c is now malfunctioning, the angular position computing circuit 6 calculates the angular position of the rotary shaft 2 using the voltage outputs Va and Vb of the first and second sensor elements 5a and 5b according to the program of FIG. 5(a). Alternatively, if it has been determined that both the first and third elements 5a and 5c are now malfunctioning, the angular position computing circuit 6 produces a warning output indicating that the magnetic sensor 5 is disenabled, that is, it is impossible to determine the angular position of the rotary shaft 2 to the external system which is to receive the output of the angular position detector 1.

As will be apparent from the above discussion, the angular position detector 1 works to monitor the failures in operation of the first to third sensor elements 5a to 5c of the magnetic sensor 5 using the voltage outputs Va, Vb, and Vc in order to avoid an error in computing the angular position of the rotary shaft 2 in the angular position computing circuit 6.

The voltage outputs Va, Vb, and Vc of the first, second, and third sensor elements 5a, 5b, and 5c each change at a varying rate near the maximum and minimum value thereof as a function of the angular position of the rotary shaft 2 and are in periodic waves out of phase each other. Thus, when, for example, the voltage output Va of the first sensor element 5a lies near the maximum or minimum value thereof, the voltage outputs Vb and Vc of the other second and third sensor elements 5b and 5c will appear on the straight segments of the periodic triangular waves between the maximum and minimum values thereof where the voltage outputs Vb and Vc change at a constant rate as a function of the angular position of the rotary shaft 2. This enables the angular position computing circuit 6 to make a determination of whether either of the second and third sensor elements 5b and 5c has failed or not by calculating a difference between changes in the voltage outputs Vb and Vc within a given period of time and comparing them with the allowable voltage ranges ΔVb' and ΔVc'. When the voltage output Vb of the second sensor element 5b lies near the maximum or minimum value thereof, the voltage outputs Va and Vc of the other first and third sensor elements 5a and 5c will appear on the straight segments of the periodic waves between the maximum and minimum values thereof where the voltage outputs Va and Vc change at a constant rate as a function of the angular position of the rotary shaft 2. This enables, like the above, the angular position computing circuit 6 to make a determination of whether either of the first and third sensor elements 5a and 5c has failed or not by calculating a difference between changes in the voltage outputs Va and Vc in a given period of time and comparing them with the allowable voltage ranges ΔVa' and ΔVc'. The operation applies to the determination of failure in operation of the third sensor element 5c.

The voltage outputs Va and Vb of the first and second sensor elements 5a and 5b, as described already, show periodic triangular waves which are approximately 90° out of phase with each other. This causes the voltage outputs Va and Vb of the first and second sensor elements 5a and 5b to be identical with each other near the maximum and minimum values thereof (i.e., the intersections VL and VH in FIG. 4(d)). Therefore, the maximum and minimum values of the first and second voltage outputs Va and Vb, as used in the determinations in steps 101 and 107, may be derived based on voltage levels appearing at the intersections VL and VTH, thereby enabling two of the voltage outputs Va, Vb, and Vc to be selected for use in determining the changes thereof in step 112, 108, or 102.

The circumferential lengths Kc and Ke of the gaps 41 within which no sensor element is disposed are smaller than the circumferential lengths Ka, Kb, and Kc of the gaps 41 within which the first to third sensor elements 5a to 5c are disposed, thereby minimizing leakages of magnetic flux flowing outside the gaps 41. This results in the stability of periodic changes in the voltage outputs Va and Vb of the first and second sensor elements 5a and 5b in the form of a rectangular wave over a 180° angular range of rotation of the rotary shaft 2.

If, for example, either of the first and second sensor elements 5a and 5b are malfunctioning, the angular position computing circuit 6 specifies which of them has failed and determines the angular position of the rotary shaft 2 using outputs of the other two sensor elements operating normally. This ensures the reliability of operation of the angular position detector 1.

The determination of which of the first to third sensor elements 5a to 5c has failed is accomplished by monitoring whether the voltage changes ΔVa, ΔVb, and ΔVc lie within the allowable voltage ranges ΔVa', ΔVb', and ΔVc' or not which are stored in the map installed in the angular position computing circuit 6.

Figure 10:
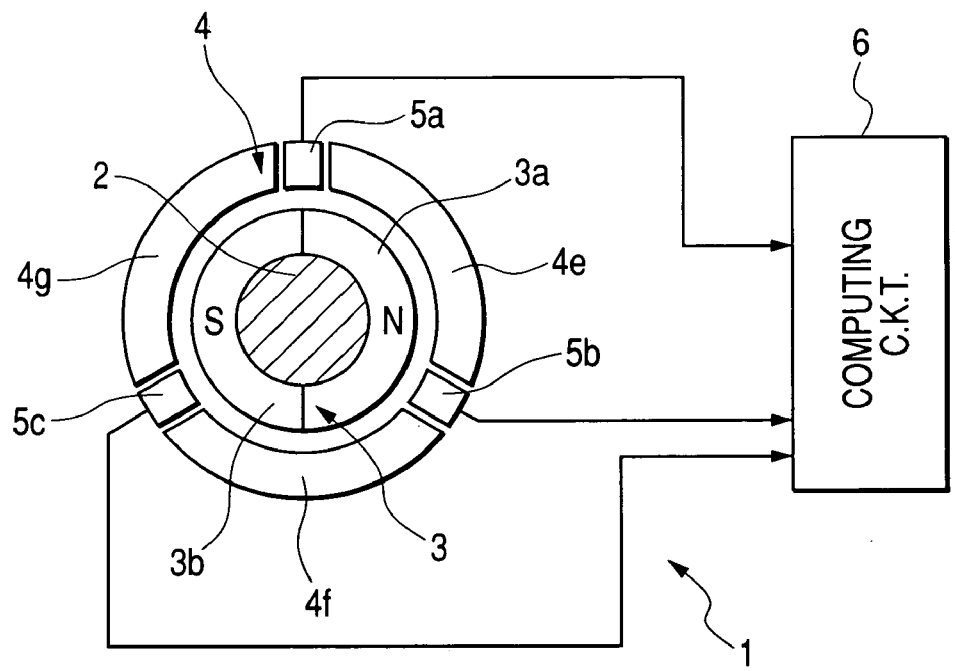
FIG. 10 is a transverse sectional view which shows an angular position sensor of the second embodiment of the invention.

FIG. 10 shows an angular position detector 1 according to the second embodiment of the invention. The same reference numbers as employed in the first embodiment will refer to the same parts, and explanation thereof in detail will be omitted here.

The yoke 4 is made of an annular member surrounding the magnet 3. The annular member consists of three arc-segments: a first yoke segment 4e, a second yoke segment 4f, and a third yoke segment 4g. The first to third yoke segments 4e, 4f, and 4g are arrayed through gaps 41 located at approximately 120° away from each other.

The magnetic sensor 5 is, like the first embodiment, made up of the first sensor element 5a, the second sensor element 5b, and the third sensor element 5c. The first sensor element 5a is disposed within the gap 41 between the first and third yoke segments 4e and 4g. The second sensor element 5b is disposed within the gap 41 between the first and second yoke segments 4e and 4f. The third sensor element 5c is disposed within the gap 41 between the second and third yoke segments 4f and 4g. The first to third sensor elements 5a to 5c work to measure magnetic flux developed in the gaps 41 as indicating the density of the magnetic flux, respectively.

The angular position computing circuit 6 works to determine an angular position (i.e., an absolute angle) of the rotary shaft 2 using the electric signals outputted from the first to third sensor elements 5a to 5c. Specifically, when the first to third sensor elements 5a to 5c are functioning normally, the angular position computing circuit 6 combines or links the outputs of the first and second sensor elements 5a and 5c together to determine the angular position of the rotary shaft 2 continuously over 90°.

Figure 11:
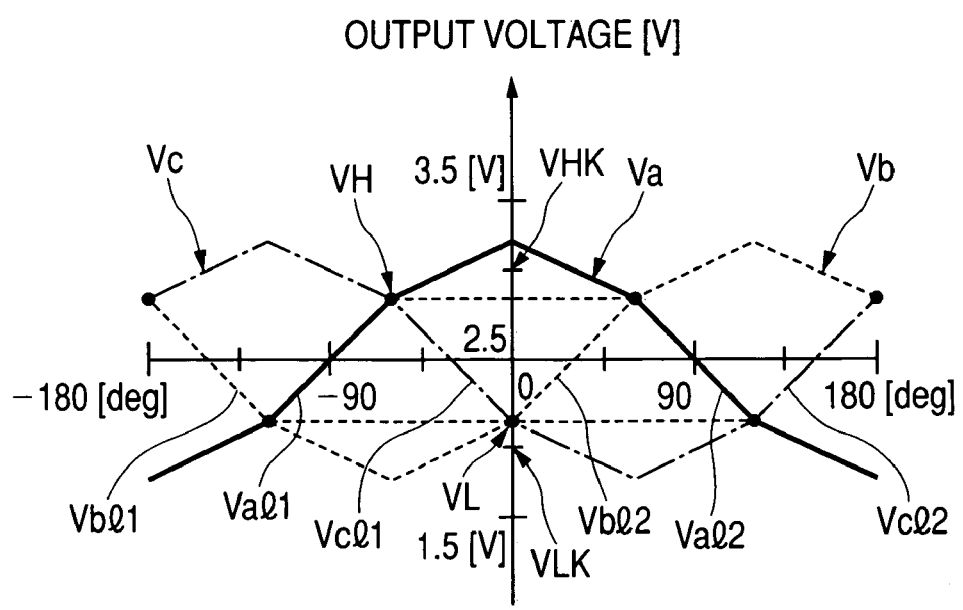
FIG. 11 is a graph which shows periodic waves of output voltages of sensor elements of a magnetic sensor upon rotation of a rotary shaft to which a magnet is affixed in the second embodiment of the invention.

The voltage signals Va, Vb, and Vc produced by the first to third sensor elements 5a to 5c, as illustrated in FIG. 11, show triangular waves which are approximately 120° out of phase with each other. This causes intersections VH and VL between two of the voltage signals Va, Vb, and Vc of the first to third sensor elements 5a to 5c to appear at angular positions of −180°, −60°, 60°, and 180° and at angular position of −120°, 0°, and 120° of the rotary shaft 2.

Figure 12:
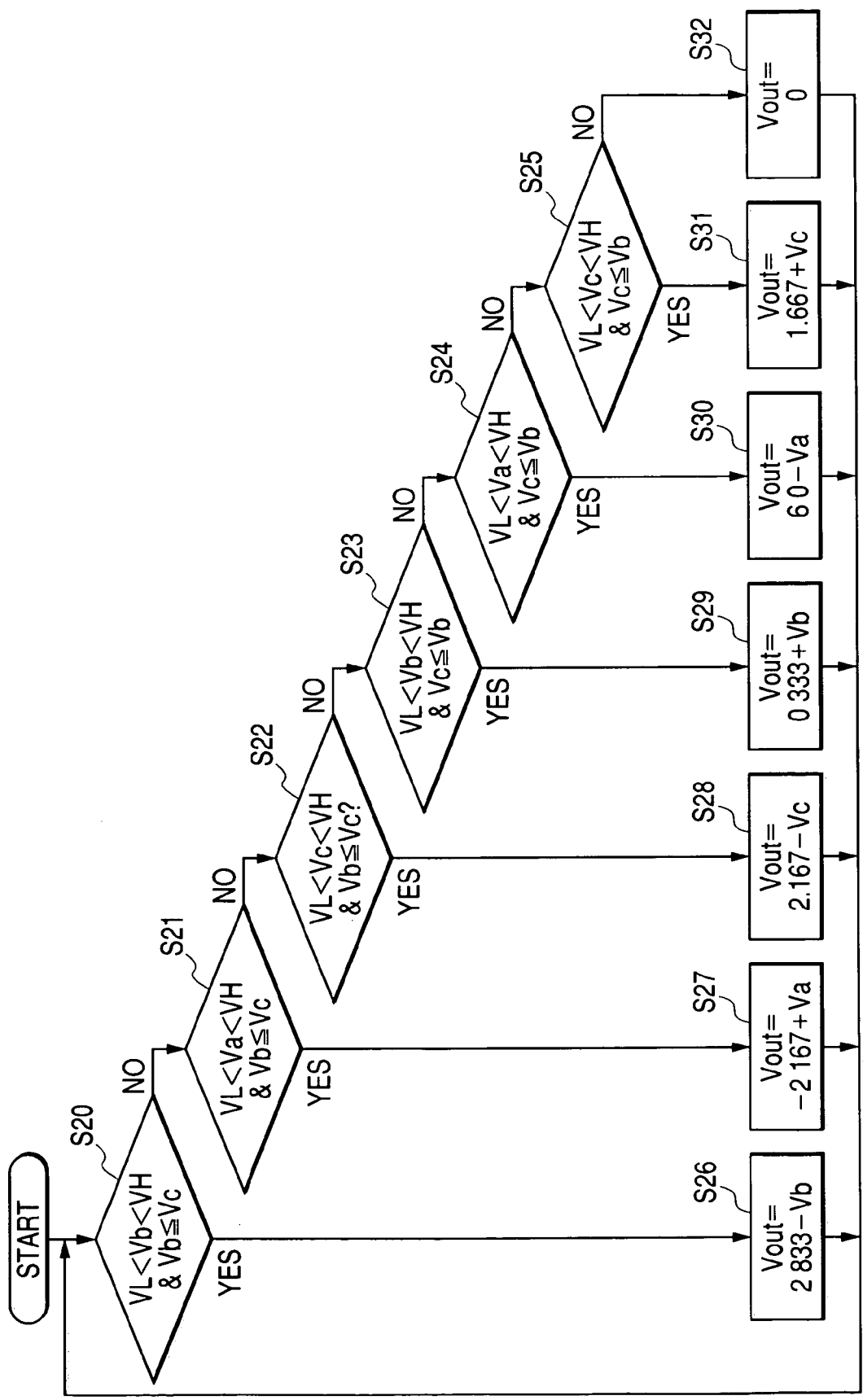
FIG. 12 is a flowchart of a program executed in an angular position computing circuit to produce an output voltage indicative of an angular position of a rotary shaft in the second embodiment of the invention.

FIG. 12 shows a flowchart of logical steps or program executed by the angular position computing circuit 6 of the angular position detector 1.

After entering the program, the routine proceeds to step 20 wherein it is determined whether the voltage output Vb of the second sensor element 5b lies within a voltage range between the intersections VL and VH or not and whether the voltage output Vc of the third sensor element 5c is greater than or equal to the voltage output Vb or not.

If a YES answer is obtained (VL<Vb<VH, Vb≦vc), then the routine proceeds to step 26 wherein the output voltage Vout is determined according to a relation of Vout=2.833−Vb and returns back to step 20.

Alternatively, if a NO answer is obtained in step 20, then the routine proceeds to step 21 wherein it is determined whether the voltage output Va of the first sensor element 5a lies within the voltage range between the intersections VL and VH or not and whether the voltage output Vc is greater than or equal to the voltage output Vb or not.

If a YES answer is obtained (VL<Va<VH, Vb≦Vc), then the routine proceeds to step 27 wherein the output voltage Vout is determined according to a relation of Vout=−2.167+Va and returns back to step 20.

Alternatively, if a NO answer is obtained in step 21, then the routine proceeds to step 22 wherein it is determined whether the voltage output Vc of the third sensor element 5c lies within the voltage range between the intersections VL and VH or not and whether the voltage output Vc is greater than or equal to the voltage output Vb or not.

If a YES answer is obtained (VL<Vc<VH, Vb≦Vc), then the routine proceeds to step 28 wherein the output voltage Vout is determined according to a relation of Vout=2.167−Vc and returns back to step 20.

Alternatively, if a NO answer is obtained in step 22, then the routine proceeds to step 23 wherein it is determined whether the voltage output Vb of the second sensor element 5b lies within the voltage range between the intersections VL and VH or not and whether the voltage output Vb is greater than or equal to the voltage output Vc or not.

If a YES answer is obtained (VL<Vb<VH, Vc≦Vb), then the routine proceeds to step 29 wherein the output voltage Vout is determined according to a relation of Vout=0.333+Vb and returns back to step 20.

Alternatively, if a NO answer is obtained in step 23, then the routine proceeds to step 24 wherein it is determined whether the voltage output Va of the first sensor element 5a lies within the voltage range between the intersections VL and VH or not and whether the voltage output Vb is greater than or equal to the voltage output Vc or not.

If a YES answer is obtained (VL<Va<VH, Vc≦Vb), then the routine proceeds to step 30 wherein the output voltage Vout is determined according to a relation of Vout=6.0−Va and returns back to step 20.

Alternatively, if a NO answer is obtained in step 24, then the routine proceeds to step 25 wherein it is determined whether the voltage output Vc of the third sensor element 5c lies within the voltage range between the intersections VL and VH or not and whether the voltage output Vb is greater than or equal to the voltage output Vc or not.

If a YES answer is obtained (VL<Vc<VH, Vc≦Vb), then the routine proceeds to step 31 wherein the output voltage Vout is determined according to a relation of Vout=1.667+Vc and returns back to step 20.

If a NO answer is obtained in step 25, then the routine proceeds to step 32 wherein the output voltage Vout is determined according to a relation of Vout=0 and returns back to step 20.

Specifically, the angular position computing circuit 6, like the first embodiment, produces the output voltage Vout which is created by combining straight sections Vbl1, Val1, Vcl1, Vbl2, Val2, and Vcl2 of the periodic waves, as illustrated in FIG. 11, of the voltage signals Va to Vc outputted by the first to third sensor elements 5a to 5c and which changes at a constant rate over a 360° angular range (i.e., −180° to +180°) of the rotary shaft 2.

Figure 13:
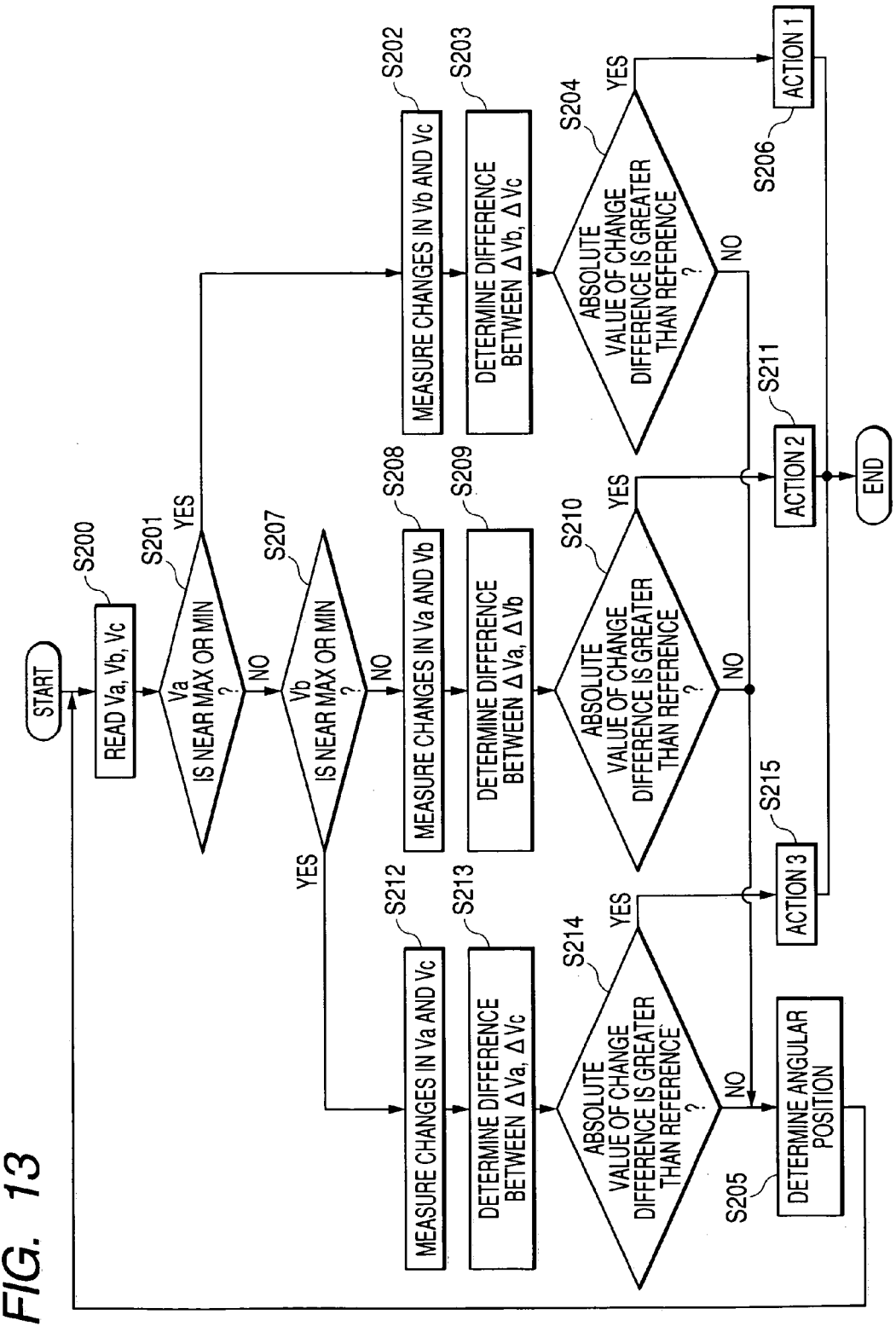
FIG. 13 is a flowchart of a program executed by an angular position computing circuit when one of sensor elements is malfunctioning.

FIG. 13 is a flowchart of a program to be executed by the angular position computing circuit 6 to detect the malfunction of the magnetic sensor 5 and to take an action if such a malfunction is determined to have occurred.

After entering the program, the routine proceeds to step 200 wherein the angular position computing circuit 6 picks up the voltage outputs Va, Vb, and Vc of the first to third sensor elements 5a to 5c of the magnetic sensor 5.

The routine proceeds to step 201 wherein it is determined whether the voltage output Va is showing a value near one of maximum and minimum voltages thereof or not, that is, whether the voltage output Va lies on the top or bottom of the periodic wave thereof, as illustrated in FIG. 11, where a rate of change in the voltage output Va per unit time during rotation of the rotary shaft 2 is not constant. If a YES answer is obtained meaning that the value of the voltage output Va lies near the maximum or minimum voltage, then the routine proceeds to step 202. Alternatively, if a NO answer is obtained, then the routine proceeds to step 207. The determination in step 201 may be achieved by determining whether one of relations of Va<VLk and Va>VHk is met or not where VLk is a minimum reference voltage level that is the voltage level appearing at the intersection VL minus a given voltage level, and VHk is a maximum reference voltage level that is the voltage level appearing at the intersection VH plus a given voltage level.

In step 202, changes ΔVb and ΔVc in the voltage outputs Vb and Vc of the first and third sensor elements 5a and 5c in a given time period are determined. Specifically, step 202 is entered when the value of the voltage output Va lies near the maximum or minimum voltage, in other words, when the levels of the voltage outputs Vb and Vc of the second and third sensor elements 5b and 5c that are 120° out of phase with the voltage output Va, respectively, are appearing on the straight segments of the periodic waves thereof, as illustrated in FIG. 11, where the levels of the voltage outputs Vb and Vc change at a constant rate as a function the angular position of the rotary shaft 2. Step 202, therefore, determines the changes ΔVb and ΔVc in the voltage outputs Vb and Vc which are changing as a function of the angular position of the rotary shaft 2.

The routine proceeds to step 203 wherein a difference between the voltage changes ΔVb and ΔVc, as derived in step 202 is determined (i.e., ΔVb−ΔVc).

The routine proceeds to step 204 wherein it is determined whether an absolute value of the voltage difference ΔVb−ΔVc, as derived in step 203, is greater than a given value or not. If a YES answer is obtained meaning that |ΔVb−ΔVc| is greater than the given value, then the routine proceeds to step 206. Alternatively, if a NO answer is obtained, then the routine proceed to step 205.

In step 205, as entered if the absolute value |ΔVb−ΔVc| is determined to be smaller than the given value in step 204, the angular position computing circuit 6 determines that the first to third sensor elements 5a to 5c are now operating normally and calculates the angular position of the rotary shaft 2 using the voltage outputs Va and Vb of the sensor elements 5a and 5b according to the operation in the flowchart of FIG. 12. The routine then returns back to step 200.

In step 206, as entered if the absolute value |ΔVb−ΔVc| is determined to be greater than the given value in step 204, the angular position computing circuit 6 concludes that either of the second and third sensor elements 5b and 5c is malfunctioning and initiates the error correction/warning action 1 to specify which of the second and third sensor elements 5b and 5c is malfunctioning and to perform the error correction/warning operation, as discussed in the first embodiment.

Figure 14:
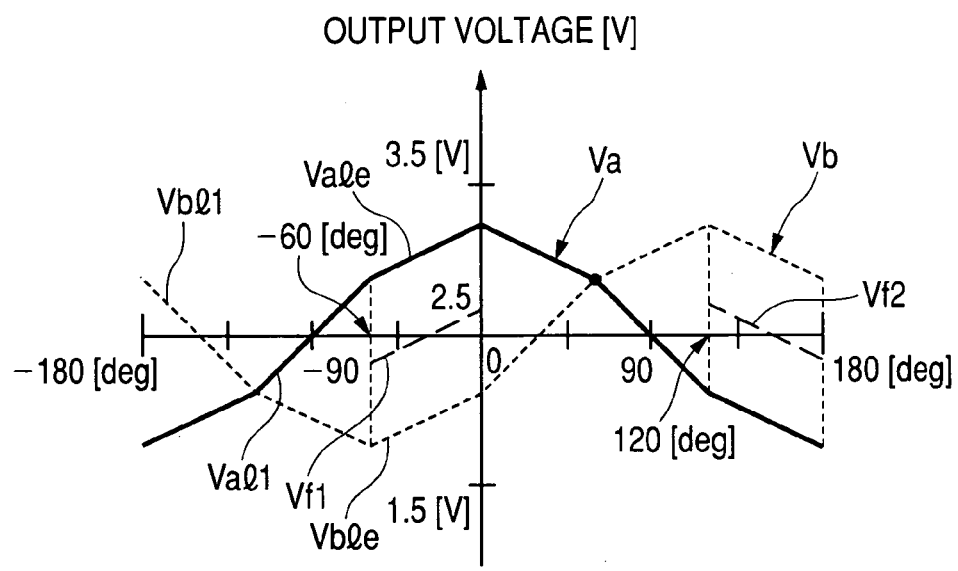
FIG. 14 is a graph which shows periodic waves of voltage outputs of first and second sensor elements of a magnetic sensor when a third sensor element has failed.
Figure 15:
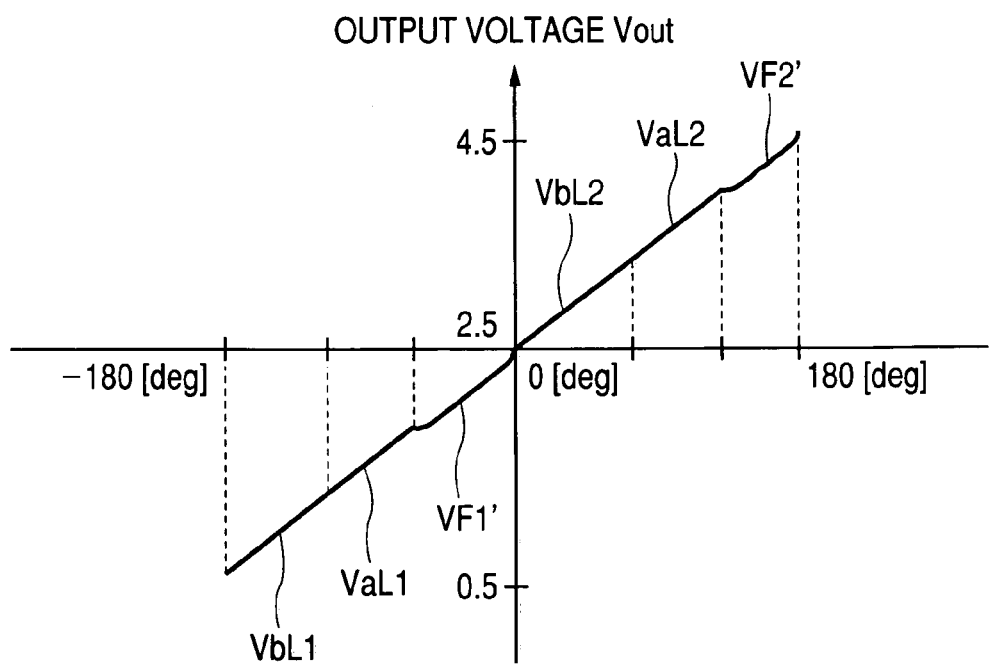
FIG. 15 is a graph which shows an output of an angular position computing circuit in the event of a malfunction of a third sensor element.

For example, if it has been determined that only the third sensor element 5c is now malfunctioning, the angular position computing circuit 6 calculates the angular position of the rotary shaft 2 using the voltage outputs Va and Vb of the first and second sensor elements 5a and 5b. Specifically, the voltage output Vc of the third sensor element 5c is mathematically projected in the following manner. First, the voltage output Va of the first sensor element 5a is added to the voltage output Vb of the second sensor element 5b. Next, the sum of the voltage outputs Va and Vb is divided by two (2) to derive an intermediate value Vf1 or Vf2, as illustrated in FIG. 14. These operations are carried out cyclically over given angular ranges (e.g., −60° to 0° and +120° to +180° in the example illustrated in FIG. 14) to calculate the intermediate values Vf1 and Vf2 repeatedly to define segments, as indicated by broken lines in FIG. 14. An inclination of the segments is corrected using a predetermined inclination correction value to define segments Vf1' and Vf2', as indicated in FIG. 15, of a periodic voltage wave corresponding to that of the voltage output Vc, as illustrated in FIG. 11. Finally, the angular position computing circuit 6 combines, as illustrated in FIG. 15, the straight segments Vbl1, Val1, Vbl2, and Val2 of the periodic waves of the voltage outputs Va, and Vc of the sensor elements 5a and 5b and the mathematically projected straight segments Vf1' and Vf2' to determine the angular position of the rotary shaft 2.

If a NO answer is obtained in step 201 meaning that the value of the voltage output Va of the first sensor element 5a is far away from the maximum or minimum one, the routine, as described above, proceeds to step 207 wherein it is determined whether the voltage output Vb is showing a value near one of maximum and minimum voltages thereof or not. If a YES answer is obtained meaning that the value of the voltage output Vb lies near the maximum or minimum voltage, then the routine proceeds to step 212. Alternatively, if a NO answer is obtained, then the routine proceeds to step 208. The determination in step 207 may be achieved by determining whether one of relations of Vb<VLk and Vb>VHk is met or not where VLk is the minimum reference voltage level, and VHk is the maximum reference voltage level, as described above.

In step 208, changes ΔVa and ΔVb in the voltage outputs Va and Vb of the first and second sensor elements 5a and 5b in the given time period are determined. Specifically, step 208 is entered when the value of the voltage output Va is far away from the maximum or minimum voltage, in other words, when the levels of the voltage outputs Va and Vb of the first and second sensor elements 5a and 5b that are 120° out of phase with each other, are appearing on the straight segments of the waveforms thereof, as illustrated in FIG. 11, where the levels of the voltage outputs Va and Vb change at a constant rate as a function the angular position of the rotary shaft 2 and determines the changes ΔVa and ΔVb in the voltage outputs Va and Vb of the first and second sensor elements 5a and 5b.

The routine proceeds to step 209 wherein a difference between the voltage changes ΔVa and ΔVb, as derived in step 208 is determined (i.e., ΔVa−ΔVb).

The routine proceeds to step 210 wherein it is determined whether an absolute value of the voltage difference ΔVa−ΔVb, as derived in step 209, is greater than a given value or not. If a YES answer is obtained meaning that |ΔVa−ΔVb| is greater than the given value, then the routine proceeds to step 211. Alternatively, if a NO answer is obtained, then the routine proceed to step 205.

In step 211, as entered if the absolute value |ΔVa−ΔVb| is determined to be greater than the given value in step 110, the angular position computing circuit 6 concludes that either of the first and second sensor elements 5a and 5b is malfunctioning and initiates an error correction/warning action 2 to specify which of the first and second elements 5a and 5b is malfunctioning and to perform an error correction/warning operation. Specifically, the straight segments of the periodic voltage wave of one of the first and second sensor elements 5a and 5b which is now malfunctioning is mathematically calculated in the same manner as that in step 206. The other operations are identical with those in step 111 of FIG. 7, and explanation thereof in detail will be omitted here, If a YES answer is obtained in step 207 meaning that the value of the voltage output Vb of the second sensor element 5b is near the maximum or minimum one, then the routine, as described above, proceeds to step 212 wherein changes ΔVa and ΔVc in the voltage outputs Va and Vc of the first and third sensor elements 5a and 5c in the given time period are determined. Specifically, step 212 is entered when the levels of the voltage outputs Va and Vc of the first and third sensor elements 5a and 5c that are 120° out of phase with the voltage output Vb are appearing on the straight segments of the waveforms thereof, as illustrated in FIG. 11, where the levels of the voltage outputs Va and Vc change at a constant rate as a function the angular position of the rotary shaft 2 and determines the changes ΔVa and ΔVc in the voltage outputs Va and Vc of the first and third sensor elements 5a and 5c.

The routine proceeds to step 213 wherein a difference between the voltage changes ΔVa and ΔVc, as derived in step 112 is determined (i.e., ΔVa−ΔVc).

The routine proceeds to step 214 wherein it is determined whether an absolute value of the voltage difference ΔVa−ΔVc, as derived in step 213, is greater than a given value or not, If a YES answer is obtained meaning that |ΔVa−ΔVc| is greater than the given value, then the routine proceeds to step 215. Alternatively, if a NO answer is obtained, then the routine proceed to step 205.

In step 215, as entered if the absolute value |ΔVa−ΔVc| is determined to be greater than the given value in step 114, the angular position computing circuit 6 concludes that either of the first and third sensor elements 5a and 5c is malfunctioning and initiates an error correction/warning action 3 to specify which of the first and third elements 5a and 5c is malfunctioning and to perform an error correction/warning operation. Specifically, the straight segments of the periodic voltage wave of one of the first and third sensor elements 5a and 5c which is now malfunctioning is mathematically calculated in the same manner as that in step 206. The other operations are identical with those in step 115 of FIG. 7, and explanation thereof in detail will be omitted here.

As apparent from the above discussion, the angular position detector 1 of this embodiment has the first to third sensor elements 5a to 5c of the magnetic sensor 5 located at an interval of 120° away from each other. The angular position computing circuit 6 combines the straight segments Vbl1, Val1, Vcl2, Vbl2, Val2, and Vcl2 of the periodic waves of the voltage outputs Va, Vb, and Vc of the sensor elements 5a, 5b, and 5c to determine the angular position of the rotary shaft 2.

The angular position detector 1, like the first embodiment, works to monitor the failures in operation of the first to third sensor elements 5a to 5c of the magnetic sensor 5 using the voltage outputs Va, Vb, and Vc in order to avoid an error in computing the angular position of the rotary shaft 2 in the angular position computing circuit 6.

Specifically, the voltage outputs Va, Vb, and Vc of the first, second, and third sensor elements 5a, 5b, and 5c each change at a varying rate near the maximum and minimum value thereof as a function of the angular position of the rotary shaft 2 and are in periodic waves out of phase each other. Thus, when, for example, the voltage output Va of the first sensor element 5a lies near the maximum or minimum value thereof, the voltage outputs Vb and Vc of the other second and third sensor elements 5b and 5c will appear on the straight segments Vbl1 and Vcl1 or Vbl2 and Vcl2 of the periodic waves between the maximum and minimum values thereof where the voltage outputs Vb and Vc change at a constant rate as a function of the angular position of the rotary shaft 2. This enables the angular position computing circuit 6 to make a determination of whether either of the second and third sensor elements 5b and 5c has failed or not by calculating a difference between changes in the voltage outputs Vb and Vc within a given period of time and comparing them within the allowable voltage ranges ΔVb' and ΔVc'. When the voltage output Vb of the second sensor element 5b lies near the maximum or minimum value thereof, the voltage outputs Va and Vc of the other first and third sensor elements 5a and 5c will appear on the straight segments Val1 and Vcl1 or Val2 and Vcl2 of the periodic waves between the maximum and minimum values thereof where the voltage outputs Va and Vc change at a constant rate as a function of the angular position of the rotary shaft 2. This enables, like the above, the angular position computing circuit 6 to make a determination of whether either of the first and third sensor elements 5a and 5c has failed or not by calculating a difference between changes in the voltage outputs Va and Vc in a given period of time and comparing them with the allowable voltage ranges ΔVa' and ΔVc'. The operation applies to the determination of failure in operation of the third sensor element 5c.

The voltage outputs Va to Vb of the first to third sensor elements 5a to 5c, as described already, show periodic waves which are approximately 120° out of phase with each other. This causes the voltage outputs Va, Vb, and Vc of the first to third sensor elements 5a to 5c to be identical with each other near the maximum and minimum values thereof (i.e., the intersections VLk and VHk in FIG. 11. Therefore, the maximum and minimum values of the first to third voltage outputs Va to Vc, as used in the determinations in steps 201 and 207, may be derived based on voltage levels appearing at the intersections VLk and VHk plus or minus a given level, thereby enabling two of the voltage outputs Va, Vb, and Vc to be selected for use in determining the changes thereof in step 212, 208, or 202.

If, for example, either of the first and second sensor elements 5a and 5b has failed, the angular position computing circuit 6 specifies which of them has failed and determines the angular position of the rotary shaft 2 using outputs of the other two sensor elements operating normally. This ensures the reliability of operation of the angular position detector 1.

The determination of which of the first to third sensor elements 5a to 5c has failed is accomplished by monitoring whether the voltage changes ΔVa, ΔVb, and ΔVc lie within the allowable voltage ranges ΔVa', ΔVb', and ΔVc' or not which are stored in the map installed in the angular position computing circuit 6.

The angular position computing circuit 6 in each of the first and second embodiments determines that the magnetic sensor 5 is now malfunctioning when a difference between changes in voltage outputs from two of the sensor elements 5a to 5c is greater than a given value, but however, such a determination may alternatively be made when at least one of the changes in voltage outputs from any two of the sensor elements 5a to 5c shows an unusual value which is listed in a map stored in the angular position computing circuit 6 or when at least one of the voltage outputs has an unusual or excessive voltage level. The angular position computing circuit 6 may initiate the error correction/warning operations (i.e., actions 1, 2, and 3 in FIGS. 7 and 13) to determine the angular position of the rotary shaft 2 or output a warning signal indicating the event of malfunction of the magnetic sensor 5.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An angular position determining apparatus comprising:
a hard magnetic member joined to a rotary member, said hard magnetic member having a circumference and magnetized in a circumferential direction thereof to have a first and a second magnetic pole which produce a magnetic field therearound;
a soft magnetic member disposed outside the circumference of said hard magnetic member within the magnetic field produced by said hard magnetic member, said soft magnetic member having a circumference and being made up of a plurality of magnetic sections array along the circumference of said soft magnetic member through gaps, rotation of the rotary member to change a relative angular position between the said hard magnetic member and said soft magnetic member causes a magnetic flux density within each of the gaps to change;
a plurality of magnetic flux density measuring sensors each of which works to measure the magnetic flux density within one of the gaps to produce an electric signal as a function of the magnetic flux density as indicating an angular position of the rotary member;
an angular position determining circuit woricing to determine an angular position of the rotary shaft using the electric signals outputted from the magnetic flux density measuring sensors; and
a malfunction detecting circuit working to detect occurrence of a malfunction of each of the magnetic flux density measuring sensors based on the eleciric signals outputted from the magnetic flux density measuring sensors and outputting a signal indicative thereof
wherein said malfunction detecting circuit works to measure changes in the electric signals outputted from two of the magnetic flux density measuring sensors in a given period of time, when an absolute value of a difference between the changes is greater than a given value, said malfunction determining circuit determining that either of the two of the magnetic flux density measuring sensors has failed.

2. An anguiar position determining apparatus as set forth in claim 1, wherein said malfunction detecting circuit measures the changes in the electric signals outputted from the two of the magnetic flux density measuring sensors when the electric signals of the two of the magnetic flux density measuring sensors are changing at a constant rate.

3. An angular position determining apparatus as set forth in claim 1, wherein the magnetic flux density measuring sensors are implemented by a first, a second, and a third magnetic flux density measwing sensors which are disposed within the gaps, respectively, wherein the electric signal outputted from each of the first to third magnetic flux density measuring sensors changes cyclically in a form of a periodic triangular wave as a function of the angular position of the rotary shaft, and wherein when the electric signal outputted from one of the first to third magnetic flux density measuring sensors has one of a maximum and a minimum value appearing on the triangular wave thereof, said malfunction detecting circuit works to measure the changes in the electric signals outputted from other two of the first to third second magnetic flux density measuring sensors in the given period of time.

4. An angular position determining apparatus as set forth in claim 3, wherein the electric signals outputted by the first to third magnetic flux density measuring sensors are voltage signals, the voltage signals of the first and second magnetic flux density measuring sensors having the periodic triangular waves 90° out of phase with each other, the triangular waves of the voltage signals of the first and second magnetic flux density measuring sensors having a first and a second intersection in a 360° range of the angular position of the rotary shaft, wherein a voltagc level of the voltage signal at the first intersection is greater than that at the second intersection, and when the voltage signal outputted from one of the first and second magnetic flux density measuring sensors has the maximum value appearing on the triangular wave thereof, the voltage signal of the one of the first and second magnetic flux density measuring sensors is greater in voltage level than tha first intersection, and wherein when the voltage signal outputted from one of the first and second magnetic flux density measuring sensors has the minimum value appearing on the triangular wave thereof, the voltage signal of the one of the first and second magnetic flux density measuring sensors is smaller in valtage level than the second intersection.

5. An angular position determining apparatus as set forth in claim 3, wherein each of the first and second magnetic poles occupies 180° of the circumference of said hard magnetic member, wherein the gaps in said soft magnetic member are a first, a second, a third, a fourth, and a fifth gap, the first to fourth gaps being arrayed at an interval of substantially 90° away from each other along the circumference of said soft magnetic member, the fifth gap being formed intermediate between the third and fourth gaps, and wherein the first and second magnetic flux density measuring sensors are disposed within the first and second gaps located adjacent each other, respectively, while the third magnetic flux density measuring sensor is disposed within the fifth gap.

6. An angular position determining apparatus as set forth in claim 1, wherein when the absolute value of the difference between the changes is greater than the given value, said malfunction determining circuit specifies one of the two of the magnetic flux density measuring sensors which has the change in the electric signal showing an unusual value as being malfunctioning, and wherein said angular position determining circuit determines the angular position of the rotary shaft using the electric signals outputted from the other magnetic flux density measuring sensors which are in service.

7. An angular position determining apparatus as set forth in claim 3, wherein when the electric signal outputted from the third magnetic flux density measuring sensor has one of the maximum and the minimum value appearing on the triangular wave thereof, said malfunction detecting circuit works to measure the changes in the electric signals outputted from the first and second magnetic flux density measuring sensors in the given period of time, wherein when the absolute value of the difference between the changes in the electric signals of the first and second magnetic flux density measuring sensors is greater than the given value, said malfunction determining circuit specifies either of the first and second magnetic flux density measuring sensors as being malfunctioning, and wherein if the first magnetic flux density measuring sensor is determined as being malfunctioning, said angular position determining circuit determines the angular position of the rotary shaft using the electric signals outputted from the second and third magnetic flux density measuring sensors, while if the second magnetic flux density measuring sensor is determined as being malfunctioning, said angular position determining circuit determines the angular position of the rotary shaft using the electric signals outputted from the first and third magnetic flux density measuring sensors.

8. An angular position determining apparatus as set forth in claim 7, wherein said malfunction detecting circuit stores therein unusual values of the electric signals outputted from the first and second magnetic flux density measuring sensors during a period of time when the electric signals of the first and second magnetic flux density measuring sensors change at a constant rate following rotation of the rotary shaft, which are determined as expected when the first and second magnetic flux density measuring sensors are malfunctioning, and wherein said malfunction detecting circuit determines one of the first and second magnetic flux density measuring sensors which has the change in the electric signal showing a corresponding one of the stored unusual values as being malfunctioning.

9. An angular position determining apparatus as set forth in claim 3, wherein the electric signals outputted by the first to third magnetic flux density measuring sensors are voltage signals, the voltage signals of the first to third magnetic flux density measuring sensors having the periodic triangular waves 120° out of phase with each other, the triangular waves of the voltage signals of the first and second magnetic flux density measuring sensors having a first and a second intersection in a 360° range of the angular position of the rotary shaft, wherein a voltage level of the voltage signal at the first intersection is greater than that at the second intersection, and when the voltage signal outputted from one of the first and second magnetic flux density measuring sensors has the maximum value appearing on the triangular wave thereof, the voltage signal of the one of the first and second magnetic flux density measuring sensors is greater in voltage level than the first intersection, and wherein when the voltage signal outputted from one of the first and second magnetic flux density measuring sensors has the minimum value appearing on the triangular wave thereof, the voltage signal of the one of the first and second magnetic flux density measuring sensors is smaller in voltage level than the second intersection.

10. An angular position determining apparatus as set forth in claim 9, wherein each of the first and second magnetic poles occupies 180° of the circumference of said hard magnetic member, wherein the gaps in said soft magnetic member are a first, a second, and a third gap which are arrayed at an interval of substantially 120° away from each other along the circumference of said soft magnetic member, and wherein the first to third magnetic flux density measuring sensors are disposed within the first to third gaps, respectively.

11. An angular position determining apparatus as set forth in claim 9, wherein when the absolute value of the difference in the changes in the electric signals of any two of the first to third magnetic flux density measuring sensors is greater than the given value, said malfunction detecting circuit determines either of the two of the magnetic flux density measuring sensors as being malfunctioning, and wherein if the first magnetic flux density measuring sensor is determined as being malfunctioning, said angular position determining circuit determines the angular position of the rotary shaft using the electric signals outputted from the second and third magnetic flux density measuring sensors, if the second magnetic flux density measuring sensor is determined as being malfunctioning, said angular position determining circuit determines the angular position of the rotary shaft using the electric signals outputted from the first and third magnetic flux density measuring sensors, and if the third magnetic flux density measuring sensor is determined as being malfunctioning, said angular position determining circuit determines the angular position of the rotary shaft using the electric signals outputted from the first and second magnetic flux density measuring sensors.

12. An angular position determining apparatus as set forth in claim 11, wherein said malfunction detecting circuit stores therein unusual values of the electric signals outputted from the first to third magnetic flux density measuring sensors during a period of time when the electric signals of the first to third magnetic flux density measuring sensors change at a constant rate following rotation of the rotary shaft, which are provided as expected when the first to third magnetic flux density measuring sensors are malfunctioning, and wherein said malfunction detecting circuit determines one of the first to third magnetic flux density measuring sensors which has the change in the electric signal showing a corresponding one of the stored unusual values as being malfunctioning.

13. An angular position determining apparatus comprising:
- a hard magnetic member joined to a rotary member, said hard magnetic member having a circumference and magnetized in a circumferential direction thereof to have a first and a second magnetic pole which produce a magnetic field therearound;
- a soft magnetic member disposed outside the circumference of said hard magnetic member within the magnetic field produced by said hard magnetic member, said soft magnetic member having a circumference and being made up of a plurality of magnetic sections arrayed along the circumference of said soft magnetic member through gaps, rotation of the rotary member to change a relative angular position between the said hard magnetic member and said soft magnetic member causes a magnetic flux density within each of the gaps to change;
- a first magnetic flux density measuring sensor, a second magnetic flux density measuring sensor, and a third magnetic flux density measuring sensor, each of said first to third magnetic flux density measuring sensors being disposed in one of the gaps and arrayed at different intervals away from each other in a circumferential direction of said soft magnetic member, each of said first to third magnetic flux density measuring sensors working to measure the magnetic flux density within a corresponding one of the gaps to produce an electric signal as a function of the magnetic flux density as indicating an angular position of the rotary member;
- an angular position determining circuit working to determine an angular position of the rotary shaft using the electric signals outputted from the magnetic flux density measuring sensors; and
- a malfunction detecting circuit working to detect occurrence of a malfunction of each of the magnetic flux density measuring sensors based on the electric signals outputted from the magnetic flux density measuring sensors and outputting a signal indicative thereof,
- wherein the magnetic flux density measuring sensors are disposed within some of the gaps, each of the gaps within which the magnetic flux density measuring sensors are disposed having a length in a circumferential direction of said soft magnetic member which is smaller than that of one of the gaps within which no magnetic flux density measuring sensor is disposed.

* * * * *